(12) United States Patent
Pierga et al.

(10) Patent No.: US 6,922,153 B2
(45) Date of Patent: Jul. 26, 2005

(54) SAFETY DETECTION AND PROTECTION SYSTEM FOR POWER TOOLS

(75) Inventors: Wojciech T. Pierga, Glenview, IL (US); Thomas R. Siwek, North Aurora, IL (US); Ahmad R. Shishegar, Woodland Hills, CA (US)

(73) Assignee: Credo Technology Corporation, Broadiew, IL (US)

( * ) Notice: Subject to any disclaimer, the term of this patent is extended or adjusted under 35 U.S.C. 154(b) by 71 days.

(21) Appl. No.: 10/437,266

(22) Filed: May 13, 2003

(65) Prior Publication Data

US 2004/0226800 A1 Nov. 18, 2004

(51) Int. Cl.$^7$ ............................................. G08B 21/00
(52) U.S. Cl. .............................. 340/686.5; 340/686.6; 340/562; 318/16; 318/480; 324/661; 324/688
(58) Field of Search ............................ 340/689, 686.1, 340/686.5, 562, 686.6; 83/62.1, 58; 307/326, 116, 328; 318/16, 480; 324/661, 688

(56) References Cited

U.S. PATENT DOCUMENTS

| | | | |
|---|---|---|---|
| 2,505,958 A | 5/1950 | Grierson | |
| 3,695,116 A | 10/1972 | Baur | |
| 4,237,421 A | * 12/1980 | Waldron | ...................... 327/517 |
| 4,836,081 A | 6/1989 | Graves et al. | |
| 5,036,588 A | 8/1991 | Cherry | |
| 5,081,406 A | * 1/1992 | Hughes et al. | ............... 318/478 |
| 5,166,679 A | 11/1992 | Vranish et al. | |
| 5,214,388 A | 5/1993 | Vranish et al. | |
| 5,303,631 A | 4/1994 | Frehaut et al. | |
| 5,363,051 A | 11/1994 | Jenstrom et al. | |
| 5,373,245 A | 12/1994 | Vranish | |
| 5,442,347 A | 8/1995 | Vranish | |
| 5,515,001 A | 5/1996 | Vranish | |
| 5,521,515 A | 5/1996 | Campbell | |
| 5,539,292 A | 7/1996 | Vranish | |
| 5,703,315 A | 12/1997 | Coggan | |
| 5,726,581 A | 3/1998 | Vranish | |
| 6,348,862 B1 | * 2/2002 | McDonnell et al. | ......... 340/562 |
| 6,376,939 B1 | * 4/2002 | Suzuki et al. | ................ 307/326 |
| 2002/0000977 A1 | 1/2002 | Vranish | |
| 2002/0017175 A1 | 2/2002 | Gass et al. | |
| 2002/0017176 A1 | 2/2002 | Gass et al. | |
| 2002/0017179 A1 | 2/2002 | Gass et al. | |
| 2002/0017180 A1 | 2/2002 | Gass et al. | |
| 2002/0017181 A1 | 2/2002 | Gass et al. | |
| 2002/0017182 A1 | 2/2002 | Gass et al. | |
| 2002/0017183 A1 | 2/2002 | Gass et al. | |
| 2002/0017184 A1 | 2/2002 | Gass et al. | |
| 2002/0020261 A1 | 2/2002 | Gass et al. | |
| 2002/0020262 A1 | 2/2002 | Gass et al. | |
| 2002/0020263 A1 | 2/2002 | Gass et al. | |
| 2002/0020265 A1 | 2/2002 | Gass et al. | |
| 2002/0020271 A1 | 2/2002 | Gass et al. | |

(Continued)

FOREIGN PATENT DOCUMENTS

| | | |
|---|---|---|
| DE | 201 02 704 U1 | 6/2001 |
| SU | 823122 | 4/1981 |
| WO | WO 03/006213 | 1/2003 |

*Primary Examiner*—Anh V. La
(74) *Attorney, Agent, or Firm*—Greer, Burns & Crain, Ltd

(57) ABSTRACT

A detection system for detecting a dangerous condition for an operator using a power tool of the type which has an exposed blade relative to a work surface and a protection system for minimizing, if not eliminating the possibility of a user being injured by contacting the blade. In one preferred embodiment of the present invention, a proximity detection system is capable of detecting the presence of a user near the blade of a table saw and a protection system that can either retract the blade below the work surface of the table saw or terminate the drive torque to the blade which can result in rapid stopping of the saw blade by a work piece that is being cut.

45 Claims, 18 Drawing Sheets

U.S. PATENT DOCUMENTS

| | | |
|---|---|---|
| 2002/0056348 A1 | 5/2002 | Gass et al. |
| 2002/0056349 A1 | 5/2002 | Gass et al. |
| 2002/0056350 A1 * | 5/2002 | Gass et al. ................... 83/62.1 |
| 2002/0059853 A1 | 5/2002 | Gass et al. |
| 2002/0059854 A1 | 5/2002 | Gass et al. |
| 2002/0059855 A1 | 5/2002 | Gass et al. |
| 2002/0066346 A1 | 6/2002 | Gass et al. |
| 2002/0069734 A1 | 6/2002 | Gass et al. |
| 2002/0170399 A1 | 11/2002 | Gass et al. |
| 2002/0170400 A1 | 11/2002 | Gass |

* cited by examiner

SAFETY DETECTION AND PROTECTION SYSTEM FOR POWER TOOLS

BACKGROUND OF THE INVENTION

The present invention generally relates to power tools, and more particularly, to safety detection and protection systems for power tools such as table saws of the type that are used for cutting wood and other materials.

For as long as power tools have existed, there has been concern for the safety of those who operate them. This is particularly true with regard to power tools of the type which have relatively large exposed moving blades that can easily cause serious injury to individuals who carelessly use the tool or who are the victim of a true accident that results from unforeseen conditions. While safety systems have been developed for machine tools and other commercial tools, such as stamping tools, punch presses and other machines which exert great force in manufacturing metal and other parts, such systems often have a level of sophistication and complexity that is achieved only at a cost that is prohibitive if considered for use in tools that are marketed to individual consumers or small contractors and tradesmen.

More particularly, the well known table saw that is used by woodworkers and tradesmen has a rotating blade that is often exposed during use even though blade guards have been provided with such table saws when sold for the last several decades. Such blade guards, while effective to prevent some injuries, are considered unwieldy by many users. In fact, many users find that such blade guards actually interfere with the use of the table saws and therefore remove such blade guards most of the time. Obviously, a rotating table saw blade can cause great injury to a user and countless hand injuries occur annually because of careless use or the occurrence of fortuitous accidents.

Safety systems have been developed for use on table saws to stop the blade when the user's hand approaches the blade and which trigger a brake mechanism using an electrical solenoid to engage a brake for stopping the blade, hopefully before the user's hand is struck by the blade. Because such solenoid operated systems are generally slow acting, they have been unable to prevent injury in many operating scenarios. While other systems have been recently developed, including those set forth in a plurality of patent applications assigned to SawStop, LLC, these include various mechanisms which have a detection system for detecting a dangerous condition which triggers a brake mechanism that typically includes a pawl structure that is urged into the blade by a biasing mechanism that is retained by a fusible member that is melted by a high energy electrical current. Severing the fusible member releases the pawl to stop the blade, or in some embodiments causes the blade to be retracted down below the work surface in the case of the system being utilized with a table saw. All of these systems have one or more disadvantages in terms of cost, convenience of use, early and effective detection of a dangerous condition and the ability to provide graduated protective actions as a function of the characteristics that develop during a potentially dangerous condition.

SUMMARY OR THE INVENTION

The present invention comprises a detection system for detecting a dangerous condition for an operator using a power tool of the type which has an exposed blade relative to a work surface and a protection system for minimizing, if not eliminating the possibility of a user being injured by contacting the blade. In one preferred embodiment of the present invention, a proximity detection system is capable of detecting the presence of a user near the blade of a table saw and a protection system that can either retract the blade below the work surface of the table saw or terminate the drive torque to the blade which can result in rapid stopping of the saw blade by a workpiece that is being cut.

Several embodiments of the present invention are capable of sensing a plurality of spatial volumes adjacent the blade and measure the dielectric characteristic of each of the volumes and over time determine the existence, direction and speed of movement of human tissue in each of x, y and z directions to thereby determine if a dangerous condition exists. Moreover, such embodiments can determine the severity of the dangerous condition and the protective response that should be taken as a function of the severity of the condition.

A preferred embodiment utilizes a blade retraction mechanism that will rapidly pull the blade below the work surface of the table saw when actuated by a pyrotechnic device that has a firing time that is sufficiently fast to prevent injury to a user's hand in the vast majority of realistic operating scenarios.

DETAILED DESCRIPTION OF THE EMBODIMENTS OF THE PRESENT INVENTION

Briefly stated, the present invention will be shown and described with various embodiments of a detection system as well as various embodiments of a protection system that can operate to prevent injury to the tissue of a user during operation of a power tool. While the embodiments that are illustrated and described herein comprise systems for a power table saw, it should be understood to those of ordinary skill in the art that the detection system as well as aspects of the protection systems are applicable to other power tools. The invention is also applicable to other broader applications than may be implemented in various industries and endeavors. Shop tools other than table saws are particularly capable of having detection and protection systems adapted for their use, using the concepts and principles of the embodiments shown and described herein.

With regard to the protection system, several embodiments are shown and will be described which operate during highly dangerous conditions to propel the blade of a table saw downwardly below the table top work surface so that it cannot injure the user in highly dangerous operating situations, or which operate to interrupt the application of drive torque to the blade so that the friction of the workpiece being cut by the blade will rapidly stop the blade for situations which are only moderately dangerous. The differentiation between highly dangerous and moderately dangerous situations is determined by various combinations of sensed and calculated characteristics that are performed by the sensing system. As will be appreciated from the ensuing discussion of various embodiments of the sensing system, it is capable of acquiring significant informational data and analyzing the same to accurately determine what actions should be taken to adequately protect the user during operation.

Figure 1:
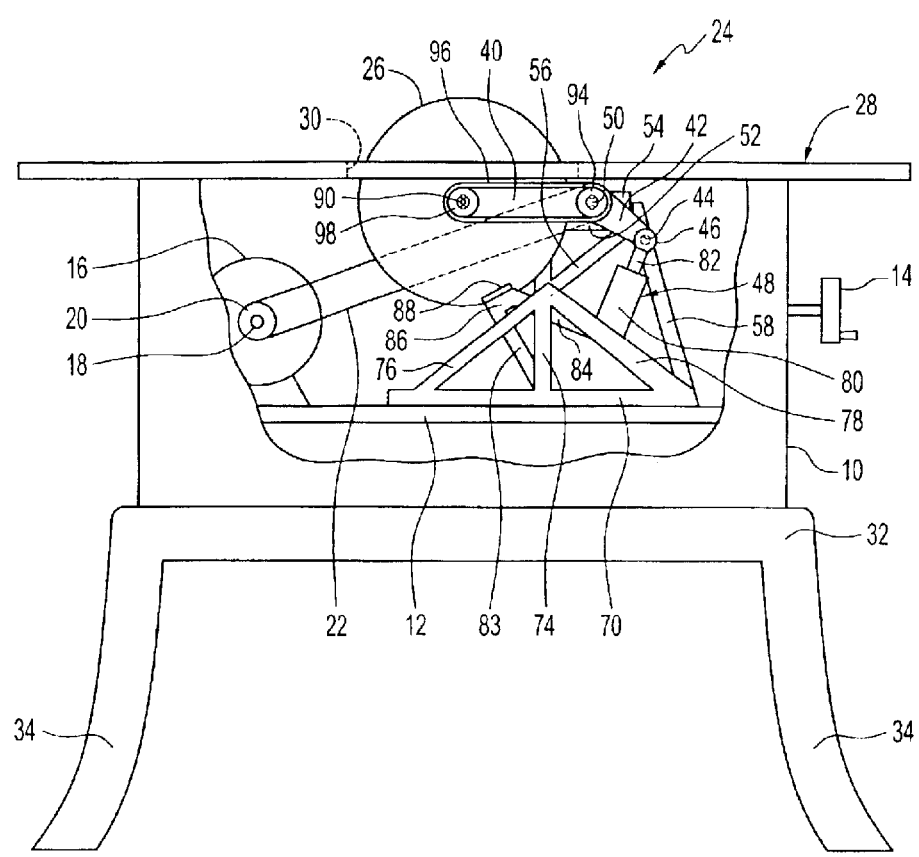
FIG. 1 is a side elevation of a first embodiment of a blade retracting mechanism and shown in an extended position.

The first embodiment of a protection system is shown in FIG. 1 together with a representative table saw design that includes a frame structure 10 that includes a platform 12 or other blade raising mechanism that is of conventional design to those of ordinary skill in the power tool art and is controlled by a hand wheel 14, a motor 16 having a drive shaft 18 and attached pulley 20 on which a belt 22 is coupled to a retraction mechanism, indicated generally at 24, and specifically drives a saw blade 26 that is a part of the retraction mechanism. A tabletop 28 has a top work surface with an elongated slotted opening 30 through which a portion of the blade 26 can extend. The tabletop 28 has important components of a detection system attached to it or embedded in it as will be described. The frame structure 10 may have a lower portion 32 including legs 34 as is conventional.

The embodiment of the retracting mechanism 24 shown in FIGS. 1–3, as well as the additional embodiments that are shown in FIGS. 4–9 must be capable of rapidly retracting the blade below the work surface of the tabletop 28 in order to avoid injury to the tissue of a user in many possible operating circumstances. If a user's hand is close to and is also moving rapidly toward the blade 26, it is a formidable task for the detecting system to detect such a highly dangerous condition, actuate the retraction mechanism and have the mechanism pull the blade down below the work surface in a sufficiently short time that the user's tissue does not come into contact with the blade. Worst case scenarios include a kickback scenario where a work piece being cut, e.g., a piece of lumber, becomes caught by the blade. When this occurs, the work piece initially is raised off of the work surface and as the blade continues to rotate, the work piece is carried toward the top of the blade and is then rapidly accelerated back toward the user. Such a kickback circumstance often has the effect of pushing at least one of the user's hands back into the blade. In that situation, the velocity of the work piece moving toward the blade has been measured in excess of 240 inches per second. This equates to about 6 meters per second or 6 millimeters per millisecond.

If a user's hand is moving toward the blade, it should be apparent that if the blade can begin moving downwardly, it will move away from the oncoming hand as the blade travels downwardly. However, even taking that positive consideration into account, it is necessary that the blade begin its downward movement in about three to four milliseconds in order to prevent injury to tissue. Since the movement of the blade is the final step in the process, it is necessary that the detection of the dangerous condition as well as the generation of an actuating signal to the retraction mechanism must be done in a very short time, i.e., in the range of 100 to 500 microseconds. This time can vary upwardly or downwardly depending upon the nature of operation of the detecting system and specific operation conditions.

Figure 2:
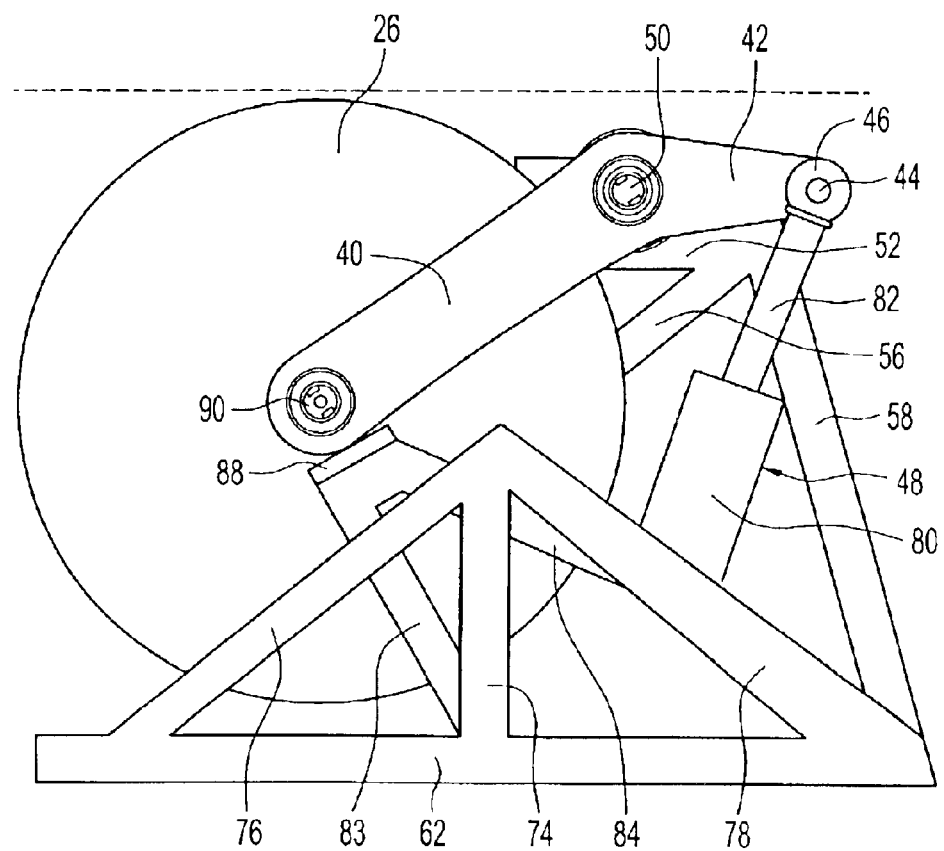
FIG. 2 is a side elevation of the blade retracting mechanism shown in FIG. 1, and is shown in a retracted position.
Figure 3:
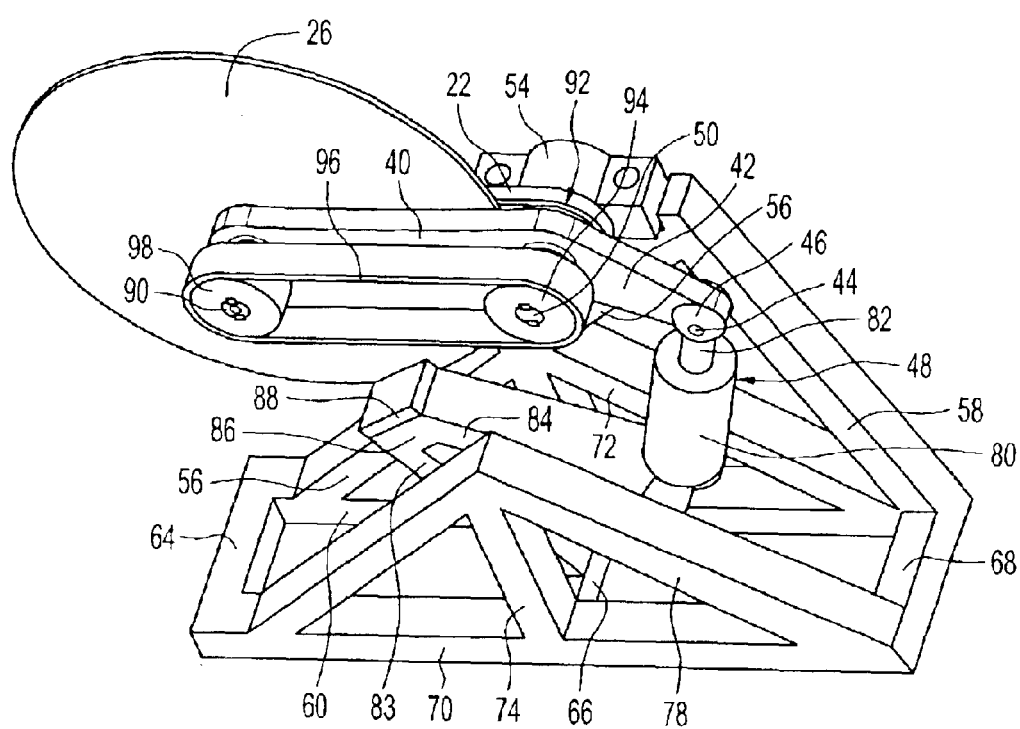
FIG. 3 is a perspective view of blade retracting mechanism of FIGS. 1 and 2, and is shown in an extended position.

Returning to the embodiment illustrated in FIGS. 1–3, the retraction mechanism 24 includes a lever arm 40 which has an obtuse angled extension 42 at the right end as shown in the drawings, with the end portion of the extension 42 having an opening 44 for receiving a pin 46 that is a part of an actuator, indicated generally at 48. The lever arm 40 pivots about a shaft 50 that is journaled in a bracket 54 that is preferably bolted to a frame member 52 with bolts (not shown). The frame member 52 is part of a overall support frame structure that also includes angular members 56, 58 and a base member 60 on the back side. Other portions of the frame structure includes cross-connecting members 64, 66 and 68 which are connected to a lower diagonal side frame member 72 that extends between members 56 and base member 60. On the near side of the frame structure, the base frame 70 is connected to vertical member 74 as well as front and rear diagonal member 76 and 78. The actuator 48 has a cylinder 80 and an extendable rod 82, with the cylinder 80 being mounted between the diagonal members 72 and 78. A center frame portion includes diagonal members 83 and 84 with a connected portion 86 that carries a pad structure 88 that operates to brake the movement of the lever arm 40 when the actuator 48 is fired. At the left end of the pivot arm 40 is an arbor 90 which carries the blade 26. In this regard, because the blade is part of the detecting system, an excitation signal is applied to it and the blade is electrically isolated from the arbor 90. In this regard, the arbor 90 while not shown specifically, preferably includes a plastic bushing or the like which electrically isolates the arbor 90 from the blade 26 itself. In this regard, the blade 26 is also isolated from the frame members as well as the lever arm 40.

The blade 26 is shown in its working position in FIG. 1 where a portion of the blade extends above the work surface of the tabletop 28, and in that position, the actuator 48 has its rod 82 in a retracted position relative to the cylinder 80. FIG. 2 illustrates the retraction mechanism after it has been actuated, and in this figure, the rod 82 is shown in an extended position and the lever arm 40 is pivoted downwardly so that the end of the lever arm 40 is in contact with the pad 88.

To drive the blade 26, the belt 22 from the motor 16 extends to and is wrapped on a pulley 92 that is connected to the shaft 50 which also carries another pulley 94 that carries a belt 96 that rides on another pulley 98 that is attached to the arbor 90. While the lever arm 40 pivots around the shaft 50, it should be understood that the distance between the drive shaft 50 and the arbor 90 remains constant regardless of the angular position of the lever arm 40. Thus, if the actuator 48 is fired, upon reloading and repositioning the same, the belts 22 and 96 of the drive mechanism will generally be unaffected. While the various pulleys and belts are shown to have a flat structure, this is merely for illustration purposes; the pulleys may have a grooved outer configuration, with the belts also having a complementary construction to fit within the grooved configuration as is known to those of ordinary skill in the mechanical arts.

While the frame structure that has been described is shown to be generally integrally formed, it should be understood that this is illustrated in a relatively schematic fashion and that the actual construction of a frame structure could be modified to have other forms. The important consideration is that it support the lever arm 40 and the actuator 48 and has sufficient strength to sustain the high forces that are generated during the retraction of the blade and to effectively stop the movement after it has been retracted. It should be apparent that various support members may be interconnected with suitable brackets or other means, rather than having largely unitary combinations of frame members. The pad 88 is preferably fabricated from a hard rubber material, but other consumable impact absorbers may also be utilized, such as plastic deformation impact absorbers.

Figure 10:
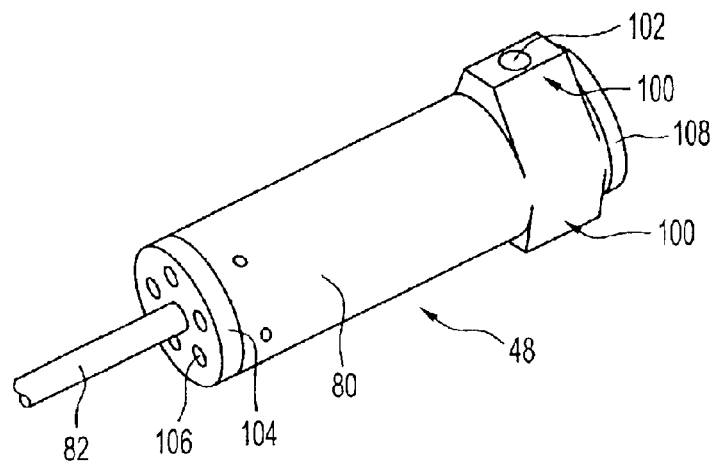
FIG. 10 is a perspective view of a pyrotechnic cartridge that is used in the first embodiment shown in FIGS. 1–3.
Figure 11:
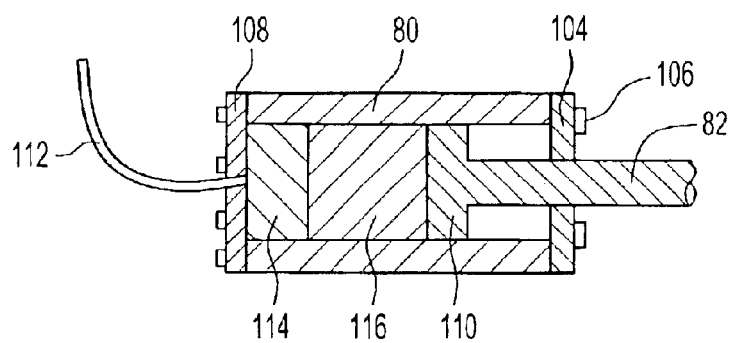
FIG. 11 is a schematic cross-section of a pyrotechnic self-contained actuator that may be used with the embodiments of the present invention.
Figure 12:
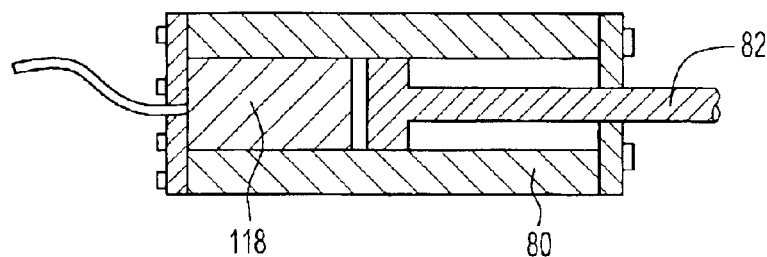
FIG. 12 is another schematic cross-section of an alternative form of actuator that may be used with the embodiments of the present invention.

With regard to the actuator 48, it is shown in FIG. 10 to have the cylinder portion 80 provided with base extensions 100, each of which have an opening 102 therein in which a pin can be inserted for pivotally attaching the actuator 48 tool to the oblique structural members 78 and 72. The cylinder 80 has an end cap 104 through which bolts 106 are provided to secure the end cap to the cylinder 80. A similar base end cap 108 is provided which is preferably also attached by bolts similar to those used at the opposite end of the cylinder. With regard to the internal construction of the actuator, it may be designed in many different forms, including the schematic representations that are shown in FIGS. 11 and 12 as two examples. In the example of FIG. 11, which is a schematic representational cross-section, the rod 82 is preferably integrally formed or attached to a piston element 110 that is moveably positioned in the cylinder 80 and electric wires 112 extend to circuitry for providing an activating signal which extends to a pyrotechnic igniter portion 114 that will rapidly ignite upon receipt of a high energy pulse being applied to it. The pyrotechnic igniter portion 114 will then ignite a propellant section 116 which will cause the piston 110 to move toward the right thereby extending the rod from the cylinder portion 80.

It should be understood that the relative proportions of the structure illustrated in FIGS. 11 and 12 are not to scale and it should be understood that the movement of the rod may extend several inches in order to operate the retraction mechanism of FIGS. 1–3 as well as in other embodiments. In the embodiment of FIG. 11, once the actuator has been triggered, it may or may not be reused depending upon the design considerations. If reusable, the propellant and pyrotechnic elements must be replaced. As shown in FIG. 12, the construction is similar with the exception that a single actuator charge cartridge 118 is utilized rather than separate pyrotechnic and propellant charges as shown in FIG. 11. While the configuration of the actuator 48 shown in FIGS. 11 and 12 are ones in which the rod structure is propelled outwardly from the cylinder portion 80, it should be understood to those of ordinary skill in the art that a pull type operation is also possible in which case the pyrotechnic element 114 and propellant 116 would be on the right side of the piston 110 in FIG. 11. Actuators may be used which are manufactured by various companies, particularly including Cartridge Actuated Devices, Inc. of Fairfield, N.J. With regard to the actuators shown in FIGS. 11 and 12, they may be sized within the range of 1½ to 2½ inches in diameter and are preferably configured so that they produce 1,000 to 10,000 pounds of force, the amount of which is a function of the mass of the portion of the retraction system that is physically moved, as well as the nature of the operation of the detection system. If the detection system only actuates pursuant to contact by a user, high amounts of force is required to provide the desired retraction speeds that prevent serious injury. If the detection system is actuated when a user comes within proximity of the blade, then a smaller amount of force that would produce a slower retraction speed may still be effective to prevent serious injury. As an example, a test of a mechanism similar to that shown in FIG. 1 was run with a 10000 lb force pyrotechnic actuator on an object that was moving toward the blade at approximately 70 inches per second and was actuated when the object was approximately 60 thousandths of an inch from the blade, and a penetration of only approximately 1/8th inch resulted. If lower force requirements are effective, actuators other than pyrotechnic actuators, such as pneumatic or spring loaded actuators may be used.

Figure 4:
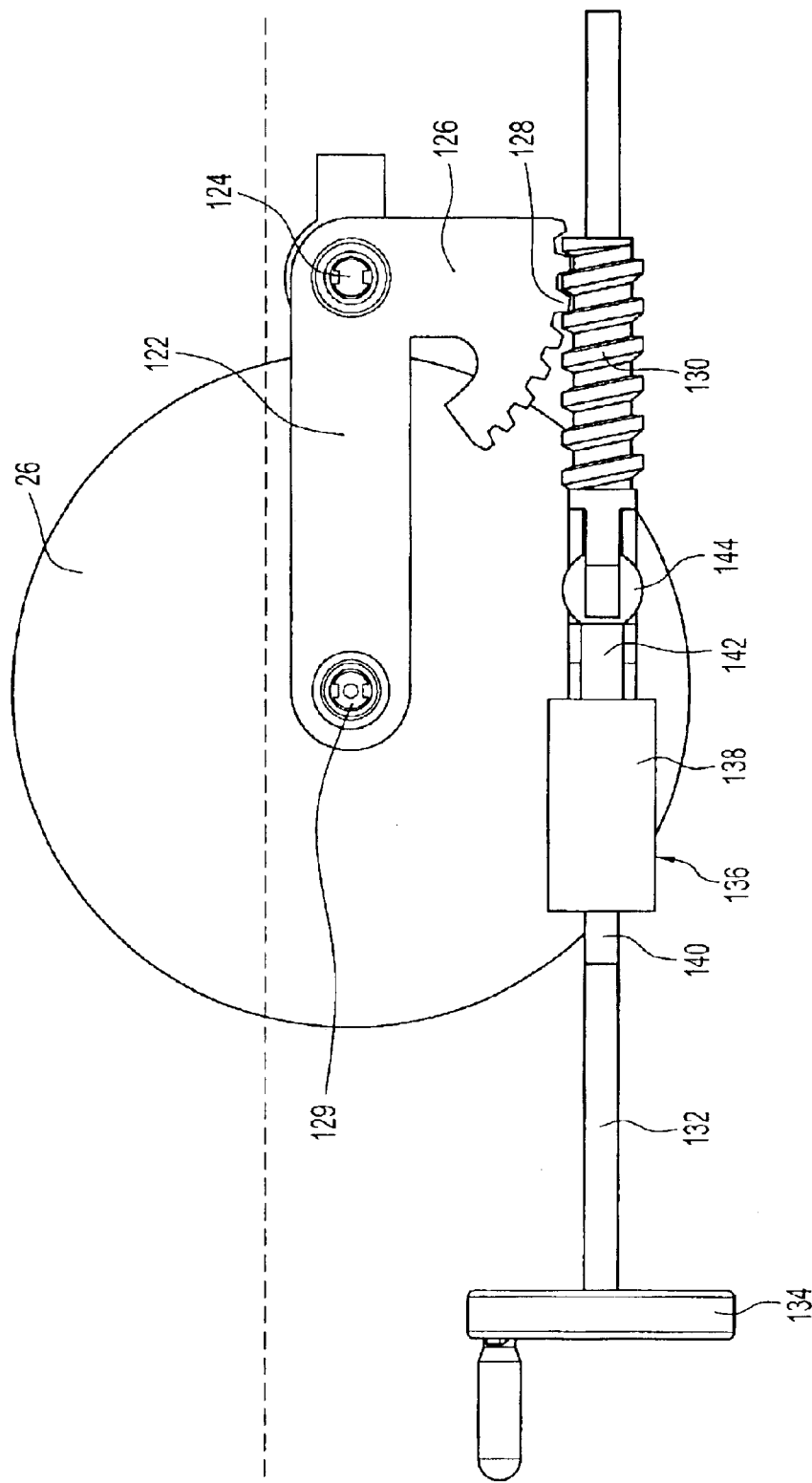
FIG. 4 is a side elevation of a second embodiment of a blade retracting mechanism that includes a blade height adjusting mechanism in the form of a rack and pinion gear arrangement.
Figure 5:
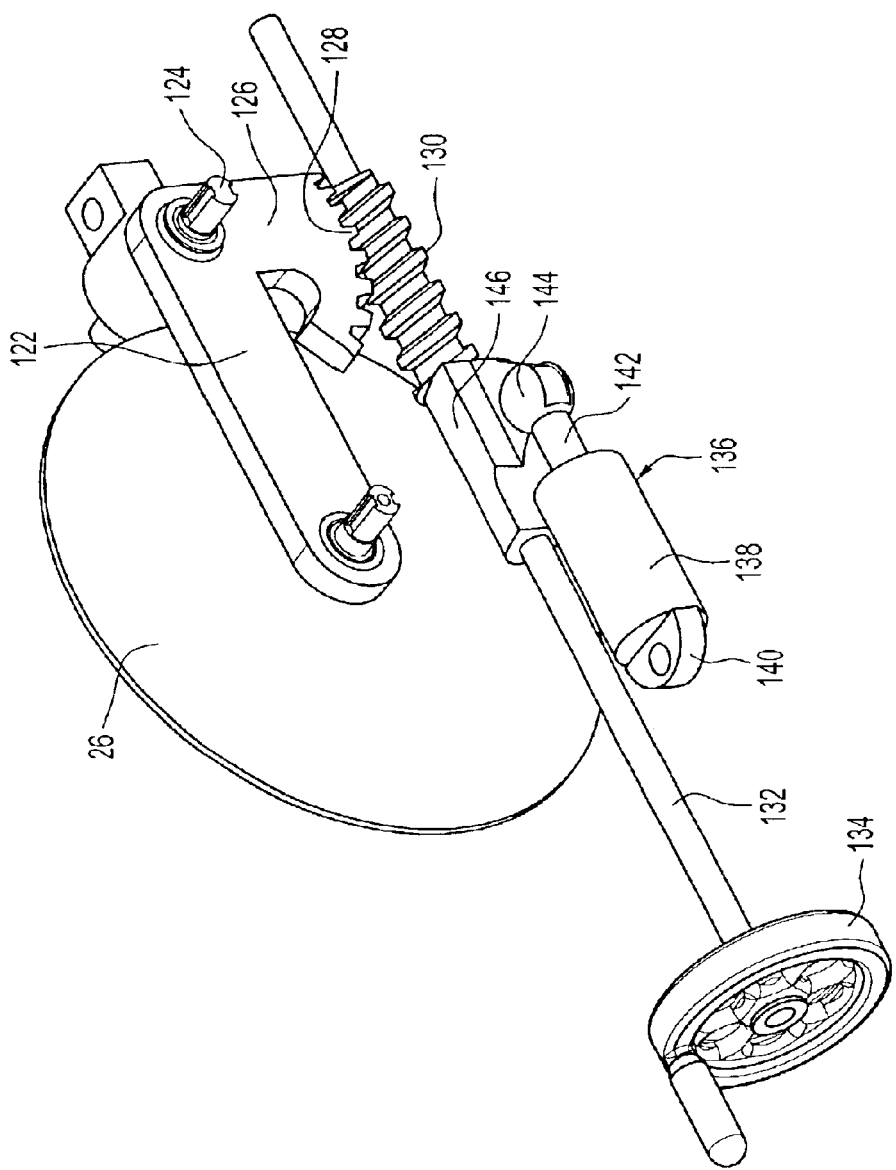
FIG. 5 is a perspective view of the embodiment shown in FIG. 4.

With regard to a second embodiment of a blade retracting mechanism and referring to FIGS. 4 and 5, a lever arm 122 is provided and pivots around shaft 124 and has a generally right angled extension 126 which has a curved outer end surface containing a rack gear portion 128. The left end of the lever arm 122 has an arbor 129 which carries the blade 26. As shown in FIGS. 4 and 5, the lever arm 122 is in its normal operating position with a significant portion extending above the work surface of the table saw which is diagrammatically illustrated by the dotted line in FIG. 4. The rack 128 is positioned to engage a worm gear 130 that is attached to a shaft 132 that has a hand wheel 134 attached to the left end portion thereof. By rotating the hand wheel 134, the worm gear 130 which is attached to the shaft 132 by means of an annular snap ring (not shown) that can be broken free to permit the worm gear 130 to be moved to the right relative to the shaft. The worm gear 130 engages the rack gear portion 128 of the lever arm 122 and causes it to rotate around the shaft 124 for the purpose of adjusting the height of the blade. This is accomplished by a spline or key arrangement (now shown, but known to those of ordinary skill in the art) that prohibits rotational movement of the worm gear 130 relative to the shaft 132, but does permit lengthwise movement thereof. As best shown in FIG. 5, an actuator indicated generally at 136 having a cylindrical portion 138 is provided and it is attached by a clevis eye 140 via a pin (not shown) to a frame structure which also is not shown, but which is similar to the frame structure that has been shown and described with regard to the embodiment shown in FIGS. 1–3. The actuator 136 has a rod 142, the outer end of which has a clevis structure 144 for attaching to a bracket 146 that contains a lengthwise opening through which the shaft 132 extends. The shaft 132 is rotatable relative to the bracket 146, the outer end of which engages the end of the worm gear 130. To quickly retract the blade 26 below the work surface of the table 28, the actuator 136 is triggered which causes the rod 142 to extend outwardly from the cylindrical portion 138. This causes the bracket 146 and worm gear 130 to move to the right as shown in the drawings and thereby cause the lever arm 122 to move downwardly in a counterclockwise direction around the shaft 124. While not specifically illustrated, the arbor 129 and shaft 124 preferably have pulleys and belt arrangements to drive the blade 22 during operation in a manner substantially shown and described with regard to the embodiment of FIGS. 1–3. It should be appreciated that the drop direction can be designed to be in the clockwise direction.

Figure 6:
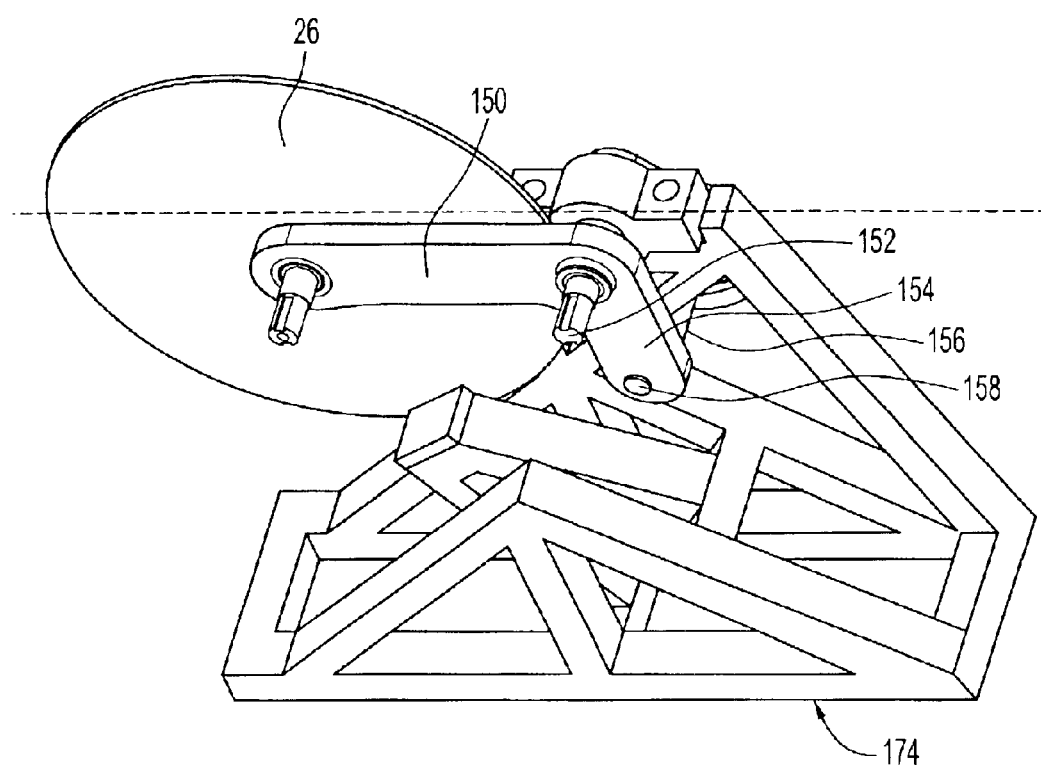
FIG. 6 is a perspective view of a third embodiment of a blade retracting mechanism, which employs a flywheel.
Figure 7:
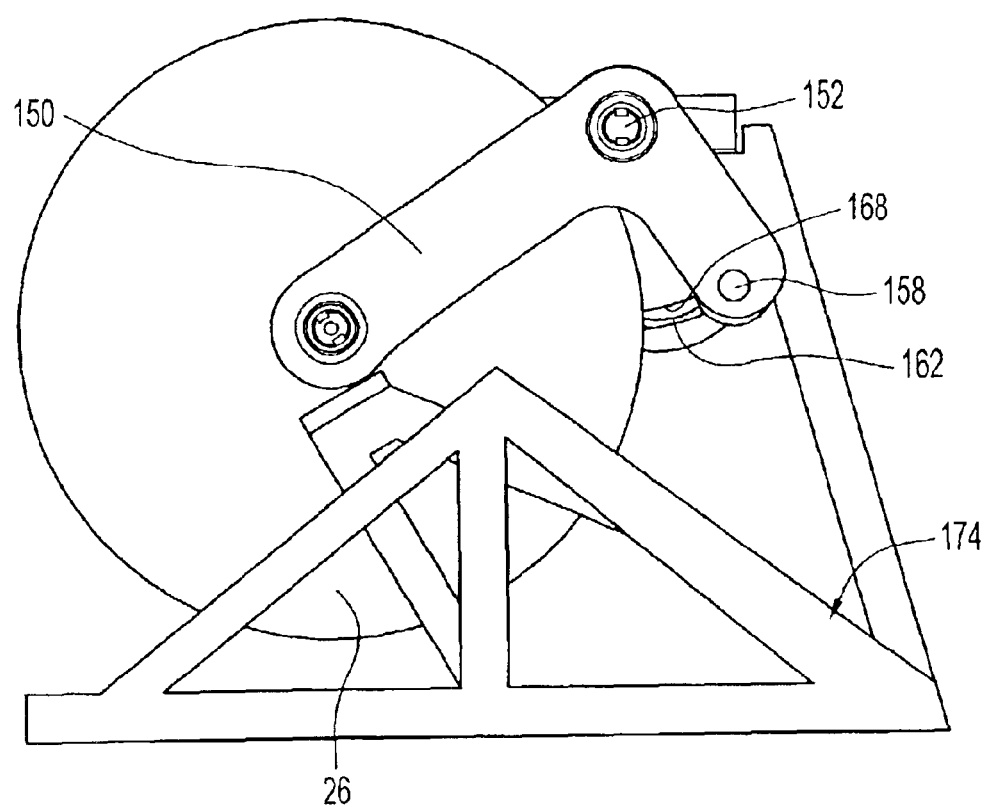
FIG. 7 is a front side elevation of the third embodiment shown in FIG. 6.
Figure 8:
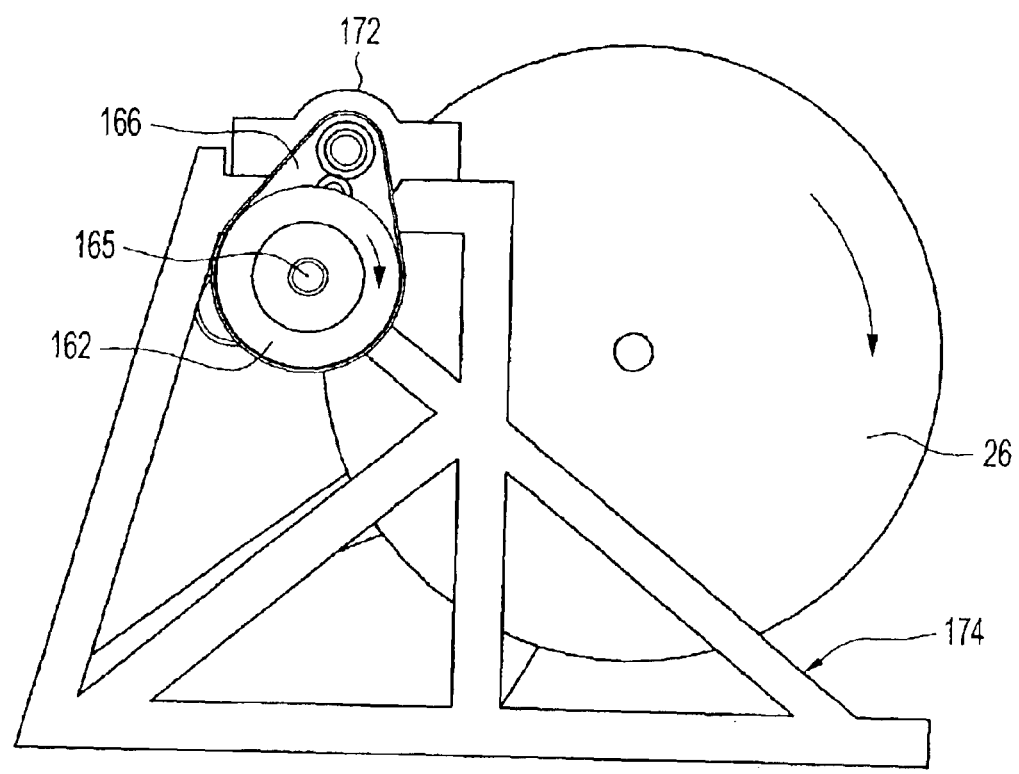
FIG. 8 is a rear side elevation of the apparatus shown in FIGS. 6 and 7.
Figure 9:
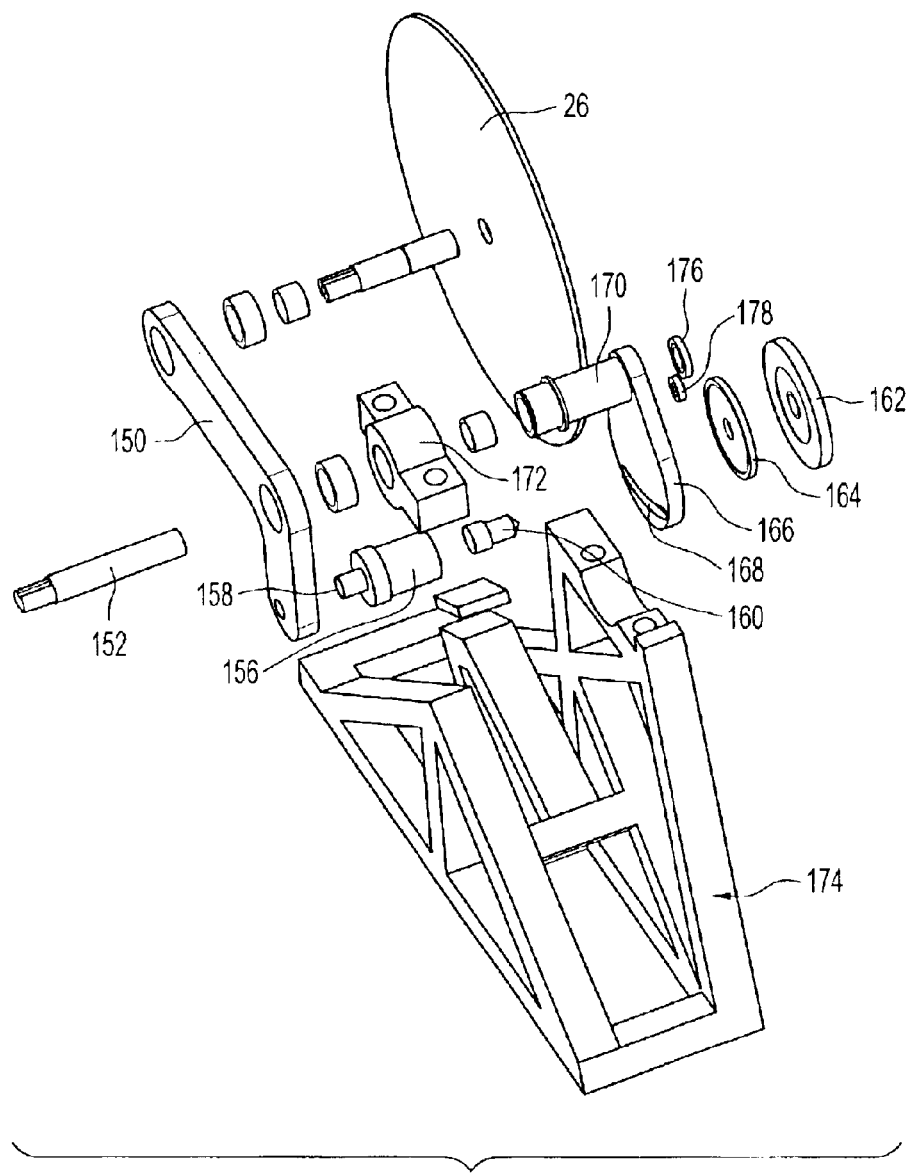
FIG. 9 is an exploded isometric showing the components of the third embodiment shown in FIGS. 6–8.

A third embodiment of a blade retracting mechanism is shown in FIGS. 6–9, with the perspective view of FIG. 6 showing the mechanism in a normal operating position and FIGS. 7 and 8 showing it in a retracted position. In this embodiment, a lever arm 150 is provided which pivots around shaft 152 and it has a generally right angled extension 154 that has an actuator 156 attached thereto, with the actuator having a small cylindrical end portion 158 that engages an opening in the extension 154. This embodiment operates according to a different principle than the embodiments of FIGS. 1–5 in that the actuator 156 which has an extendable rod 160 operate together with a flywheel 162 that is driven by and is attached to a gear 164. The gear 164 and flywheel 162 are rotatably mounted on a shaft (not shown) that is attached to a bracket 166 having an arcuate slot 168 therein. The bracket 166 has a transverse cylindrically shaped extension 170 that fits within a bracket 172 that is attached to a frame structure indicated generally at 174. A belt drive or direct drive of a motor (not shown) is connected to the shaft 152 and shaft 152 cooperate with a pair of gears 176, 178, which in turn cooperate with the gear 164 to drive the flywheel 162.

During operation, when this embodiment of the blade retracting mechanism is to be operated, the actuator 156 is triggered and the rod 160 extends through the slot 166 to contact the flywheel 162 and appreciably slow or stop it. The outer portion of the side surface of the flywheel preferably has a ridged or other type of resistance structural configuration that will enable the rod to effectively engage and to stop it from rotation and the diameter of the flywheel 162 is sufficiently greater than the diameter of the gear 164 so that the rod 160 does not contact the gear 164. Once the rod engages the flywheel 162, the inertia of the flywheel will cause the lever arm 150 to rotate the blade 26 downwardly below the work surface of the table top 28. The length of the arcuate slot 168 is sufficient to enable the blade to be completely retracted. Also, the arc traveled by the actuator rod 160 is the same as the arcuate opening 168 which is a path that has a larger arc than the diameter of the flywheel 162 as shown in FIG. 7. As is apparent, the rod 160 is approximately the same diameter as the cylindrical extension 158 of the cylinder 156 which is shown in FIG. 7 and this means that when the lever arm 150 has been rotated to its complete retracted position, the rod 160 will lose contact with the flywheel 162, as is also apparent from FIG. 7.

Turning now to the detection system of the present invention, it is capable of providing substantial amounts of informational data regarding the objects and their dielectric properties within the particular spatial volumes that exist in the area of interest, namely, the area near the blade of the table saw. By using techniques to shape the electric field around the blade and by providing multiple sensors for defining particular volumes, highly accurate information can be obtained relating to changes in the dielectric properties which result from the presence of human tissue, as opposed to the presence of only air or of a piece of wood. By carefully shaping individual volumes adjacent the blade, changes in the dielectric properties that result from the presence of human tissue within a sensed volume enable a processor to make determinations relating to the presence of human tissue, i.e., the hand of an operator, and by tracking the position of human tissue relative to the blade, can determine whether a moderately dangerous or highly dangerous condition is developing. Since the dielectric characteristics of air, wood, wet wood and human tissue are all different from one another, it is possible to differentiate the presence of human tissue at various locations relative to the blade and depending upon the direction and speed of movement of the human tissue relative to the blade, can determine whether a dangerous condition exists in a very short time, i.e., on the order of 100 to 500 microseconds.

Figure 13:
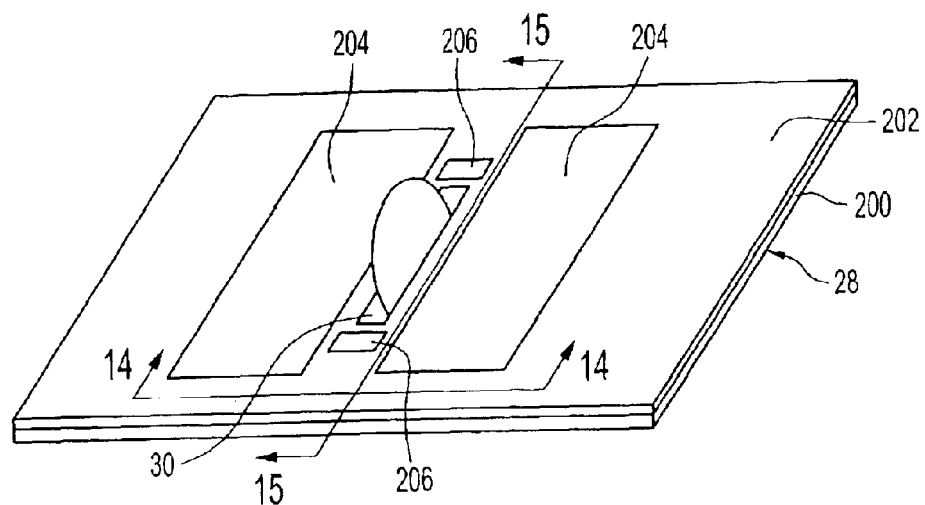
FIG. 13 is a schematic isometric view of a portion of one embodiment of the detection system that is useful with a table saw of the present invention.
Figure 14:
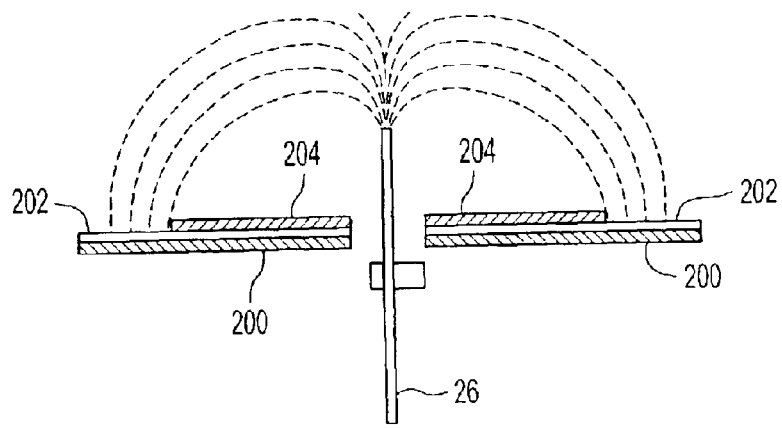
FIG. 14 is a cross-section generally taken along the line of 14—14 of FIG. 13 and illustrating the electric field lines that emanate from the electrically isolated blade when an excitation signal has been applied to it.

The detection system of the present invention can be implemented in various forms which comprise different embodiments, many of which will be shown and described hereinafter. Referring initially to FIG. 13, this implementation has a ground plane layer 200 that may extend substantially over the entire surface area of the table top 28 of the table saw or over a smaller portion of the table top surface. The ground plane may be defined by the table top or table structure if it is made of a conductive metal. The ground plane is then covered by an insulating layer 202 that is generally, but not necessarily coextensive with the ground plane 200. A slot in the table top 28 enables the saw blade 26 to extend above the work surface of the table top in position to cut a work piece, which may be a piece of lumber, plywood, plastic or other material suitable for cutting on a table saw. It is conventional that the saw blade 26 may be varied in height relative to the surface of the table top 28 as is known to most artisans who use such tools. In the embodiment of FIG. 13, there are a pair of deflection plates 204 which are positioned adjacent the sides of the blade 26 and another pair of smaller deflection plates 206 positioned at the opposite ends of the blade 26. The deflection plates are similarly made of electrically conductive material that are electrically insulated from the ground plane 200 by the insulator layer 202. In the cross-section of FIG. 14, the blade 26 is mounted on an arbor that is electrically isolated from the table and other metal surfaces of the table saw. With the blade isolated, it can be energized with an excitation field applied to it so that electric field lines emanate from the surface of the blade.

Figure 15:
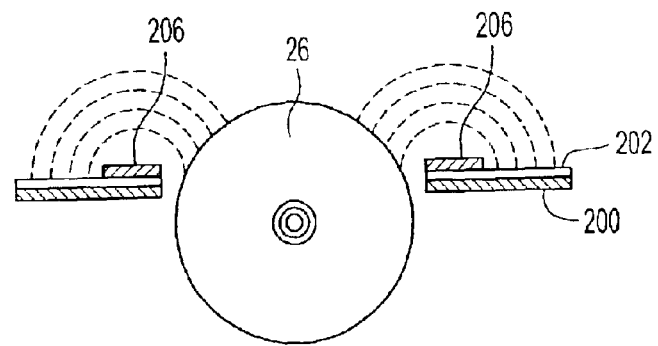
FIG. 15 is a similar view taken generally along the line of 15—15 of FIG. 13 and illustrating the field lines that emanate from the ends of the blade.

Importantly, the deflection plates 204 and 206 can also have an excitation field applied to them for the purpose of shaping the field lines that emanate from the blade and extend to the ground plane. Since the deflection plates are given an excitation field signal that is substantially the same polarity as that given to the blade, the field lines can be shaped so that they may exist in the form and shape of the dotted lines shown in FIGS. 14 and 15. If the excitation signal applied to the deflection plates is lowered, the corresponding field lines would be less curved and may easily extend in a relatively straight line from the top surface of the blade directly to ground in FIG. 14 and may not have the overall height shown in FIG. 15. It should be understood that the shape of the field lines essentially defines a spatial volume that can be detected and in the embodiment shown in FIGS. 13–15, the detector is in the form of the blade itself which is connected to circuitry that will be subsequently described that measures the dielectric properties of the defined volume.

Effectively, the blade and ground define a capacitor having a dielectric constant or characteristic that is essentially that of air in the absence of any other object having a different dielectric constant being present between the blade and the ground. If a work piece such as a piece of lumber is being cut, the presence of the lumber would affect the dielectric constant and the voltage being monitored on the blade implemented sensor would vary as the dielectric constant varied. Similarly, if human tissue approached or invaded a portion of the volume defined by the field lines between the blade and ground plane, the dielectric constant would change and be detected by the circuitry associated with the blade implemented sensor. It may be appreciated that if the excitation signal that is applied to the deflection plates is high, then the field lines may extend several inches above the blade, both on the sides and the ends of the blade. This would enable the detection system to be able to actually measure from several inches away, the velocity that the human tissue is approaching the blade. The system can also accurately measure the height of the blade.

Figure 16:
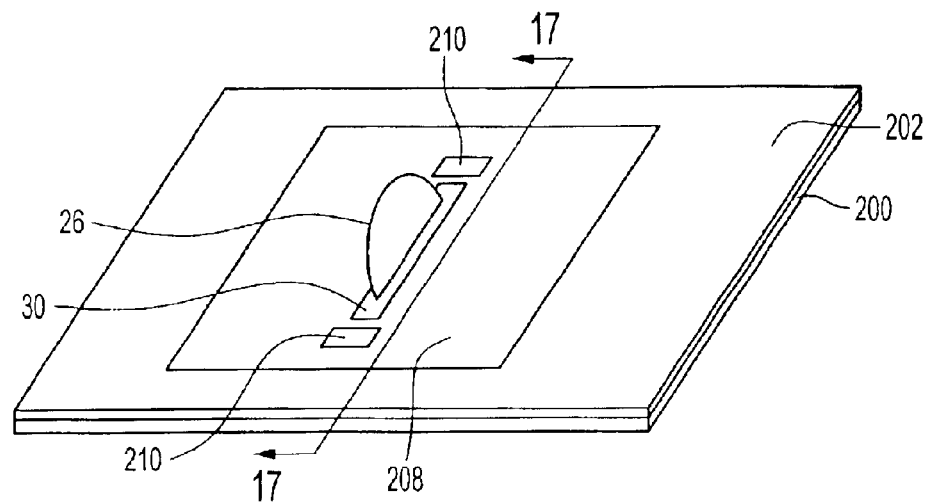
FIG. 16 is an isometric view showing an alternative embodiment of a detection system particularly illustrating a signal deflection plate with cut outs near the slotted opening of the work surface through which the blade can extend.
Figure 17:
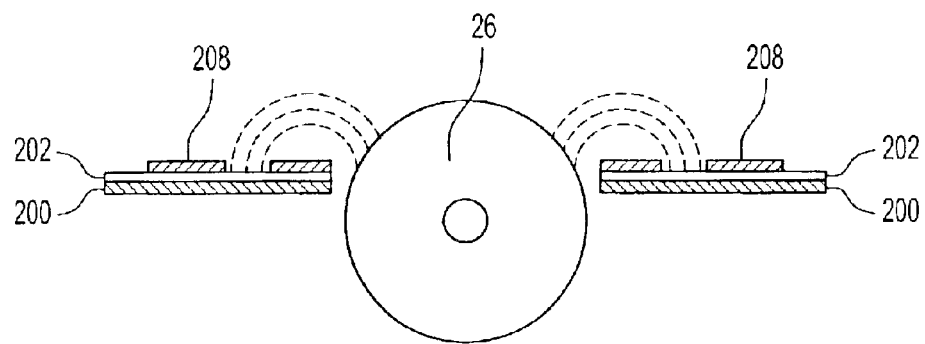
FIG. 17 is a cross-section taken generally along the line of 17—17 of FIG. 16 and illustrating the field lines that emanate from the ends of the blade.

Another similar embodiment to that shown in FIG. 13 is illustrated in FIG. 16 which has a single deflection plate 208 but which has cut outs 210 located on opposite ends of the slot 30 and blade 26 for shaping the volume that is produced when an excitation signal is applied to the blade. The field lines near the ends of the blade 26 are shown in FIG. 17.

Figure 18:
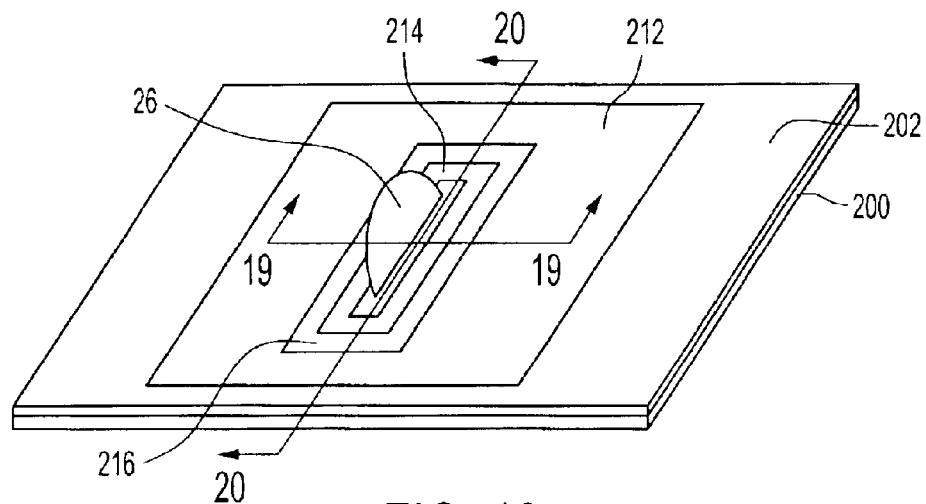
FIG. 18 is another embodiment of a detection system illustrating multiple deflection plates with exposed ground surfaces therebetween.
Figure 19:
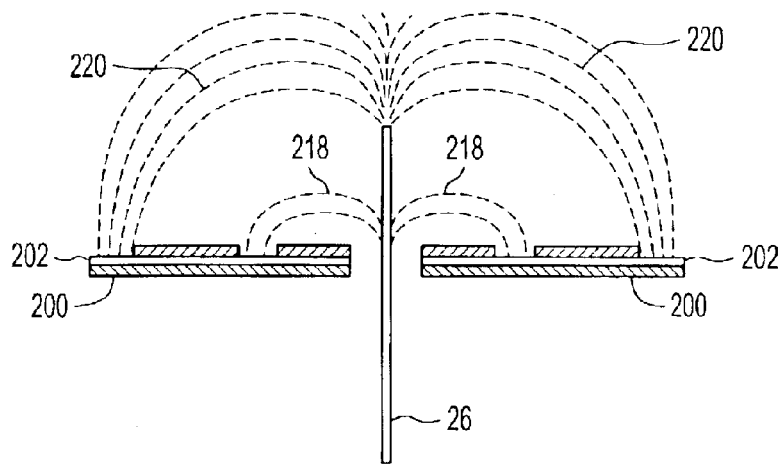
FIG. 19 is a cross-section taken generally along the line 19—19 in FIG. 18 and illustrating the field lines that emanate from the sides of the blade.
Figure 20:
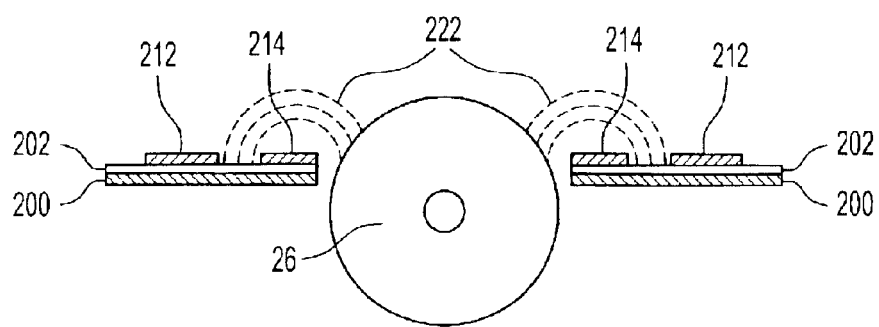
FIG. 20 is a cross-section taken generally along the line 20—20 of FIG. 18 and illustrating the field lines that emanate from the ends of the blade.

Another alternative embodiment is shown in FIG. 18 where deflection plates 212 and 214 are each shaped in the form of a hollow rectangle, so as to define an exposed ground plane in the area identified at 216. With this embodiment, there are field lines 218 extending from the blade 26 to the area 216, as well as field lines 220 also extending from the blade to the ground plane outside of the deflection plate 212. The field lines 218 are separate and distinct from the field lines 220 and are produced by suitably varying the excitation signal applied to the deflection plates 212 and 214. The field lines 222 extend from the area 216 to the ground plane between the deflection plates 212 and 214 at the ends of the blade 26.

Figure 21:
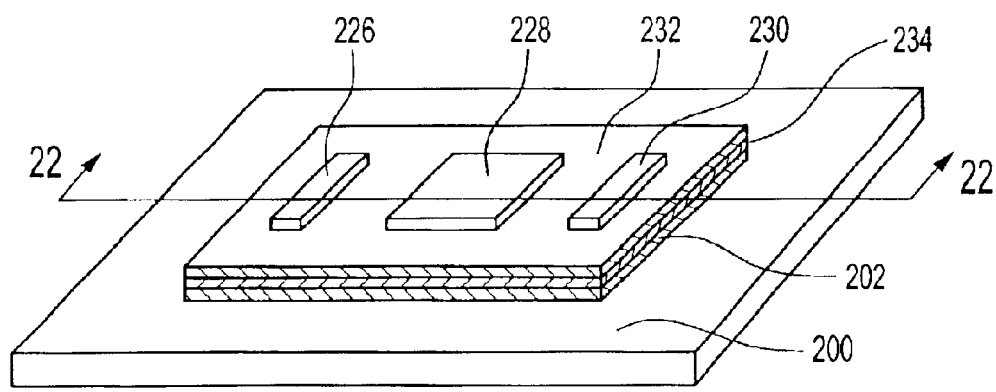
FIG. 21 is an isometric view of a representative construction of a detection system having multiple sensors and particularly illustrating the various layers of deflection plates, sensors and insulation of one embodiment thereof.
Figure 22:
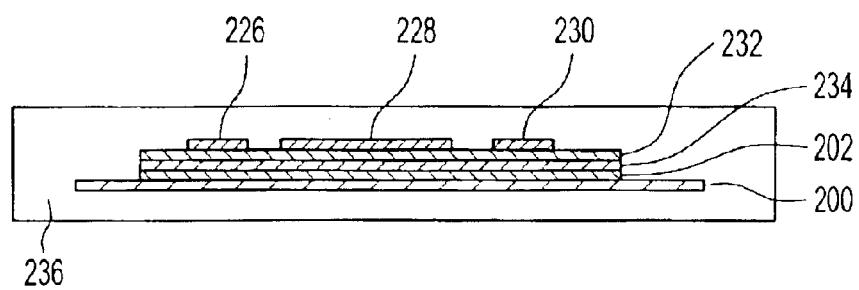
FIG. 22 is a cross-section taken generally along the line 22—22 of FIG. 21.
Figure 23:
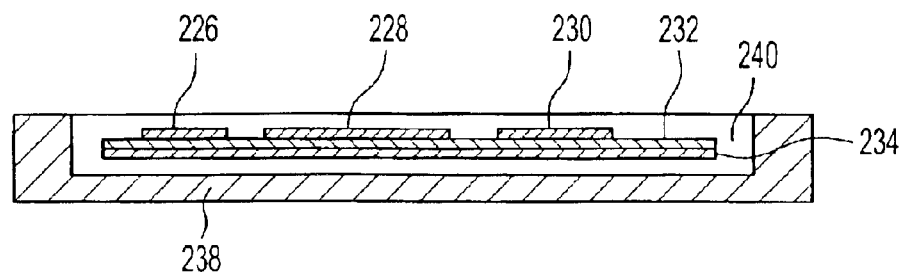
FIG. 23 is a representation of a cross-section of an alternative embodiment of a detection system shown together with a metallic tabletop having a recess in which the layers of insulation, sensors and deflection plates are positioned.

In addition to having the blade 26 be the only sensor, other sensors can be utilized in addition to as well as in place of the blade sensor. Referring to FIGS. 21, 22 and 23, the construction of representative embodiments of the detection system is shown in FIG. 21 to include sensors 226, 228 and 230 which comprise electrically conductive layers that are bonded to an insulation layer 232 which in turn is bonded to a deflection plate 234 that is bonded to an insulating layer 202 that is bonded to the ground plane 200. While these various layers may be fabricated as shown, it is preferred that the layers be embedded in a nonconductive composite tabletop material 236 as shown in FIG. 22, with the total thickness of the layer 236 being on the order of approximately ½ inch. The composite material provides a protective thickness for the sensors. Alternatively, a metallic housing 238 may be provided (and function as the ground plane) with the layers as shown in FIG. 22 also being suspended in a composite insulator layer 240 that is formed around the other layers. The sensor plate assembly can have a central blade slot and as an example serve as the throat plate. The sensor plate assembly can also be a fixed part of the saw table such as a fixed or permanent part of the saw table, but only in front and rear of the blade where protection against cutting is needed and the traditional throat plate is preferably shortened in the lengthwise direction, but not in the widthwise direction so that access for blade removal and installation is maintained.

As previously mentioned, there can be a multiplicity of sensors that are distributed across the surface area of the table saw adjacent the blade and if there are a multiplicity of sensors, they also define a multiplicity of spatial volumes and thereby provide incremental information relating to the dielectric properties within the volume as well as changes that occur in the volume due to the presence of material other than air that may invade the volume. With that as a premise, the representations illustrated in FIGS. 24–30 illustrate how different numbers and shapes of sensors can be arranged to provide optimum information relating to the volumes that are defined over the tabletop, particularly near the blade 26. For example, in FIG. 24, there is a matrix of separate sensors 250 arranged generally equidistance from one another around the blade 26 and each of the sensors may comprise a 1 cm by 1 cm square that is separately connected to appropriate circuitry that measures the dielectric properties of each volume defined by each sensor. Each volume will extend from the particular sensor to the ground plane and will extend to a height that is a function of the sensor excitation signal being applied and as a function of the signal applied to the deflection plate 204. Since each separate sensor should be connected to detecting circuitry so that the dielectric properties within its defined volume can be separately monitored, the amount of circuitry required for a hundred separate sensors, for example, will require significantly greater amount of circuitry and processing capability.

Figure 25:
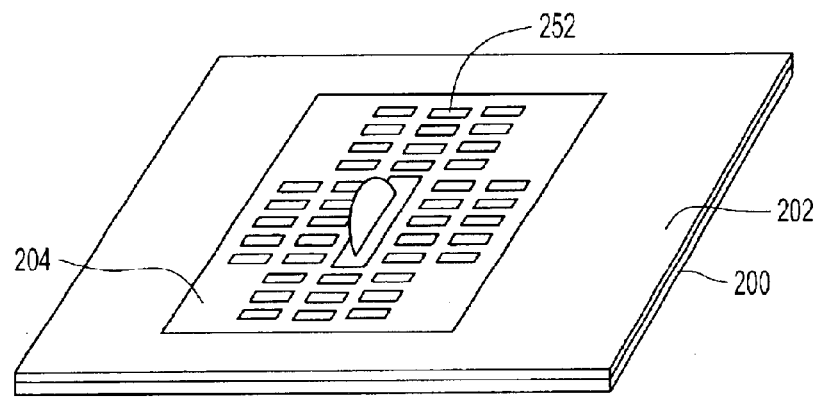
FIG. 25 is an isometric view of yet another embodiment of a detection system having a plurality of sensors arranged in a different pattern.
Figure 26:
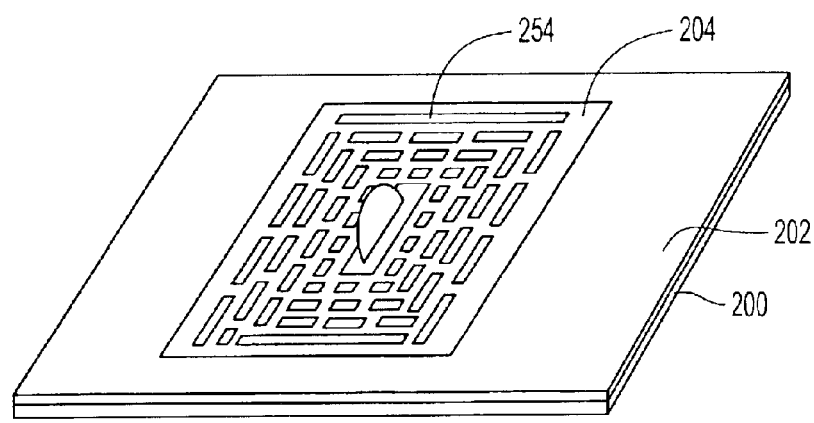
FIG. 26 is an isometric view of yet another embodiment of a detection system having a plurality of sensors arranged in a different pattern.

A sensor array that has a slightly fewer number of sensors is shown in FIG. 25 with each sensor 252 comprising a narrow strip that is positioned at a predetermined distance relative to the blade. Similarly, the array of FIG. 26 includes narrow sensor strips 254, some of which are much longer than others, with the length being proportional to the distance from the blade 26. In other words, if human tissue begins to move toward the blade, it can be detected on a broader or more macro level at a greater distance from the blade, but as it moves closer to the blade, more accurate informational data relating to its position is desirable. With this methodology, the number of sensors can be reduced without appreciably affecting the accuracy of information that is generated and processed.

Figure 27:
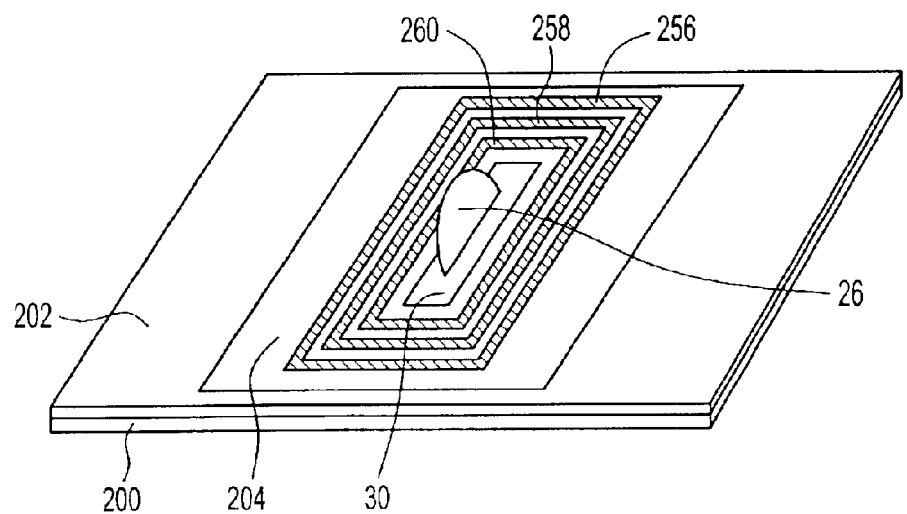
FIG. 27 is an isometric view of yet another embodiment of a detection system having a plurality of sensors arranged in a different pattern.

With the embodiment shown in FIG. 27, three hollow rectangular shapes 256, 258 and 260 are concentrically aligned relative to the slot 30. In this embodiment it should be appreciated that only three sensors are utilized, but information relating to the movement of human tissue from the outside square 256 to the inside rectangles 258 and 260 provide information relating to the direction of movement of the human tissue as well as the speed of movement toward the blade 26.

Figure 28:
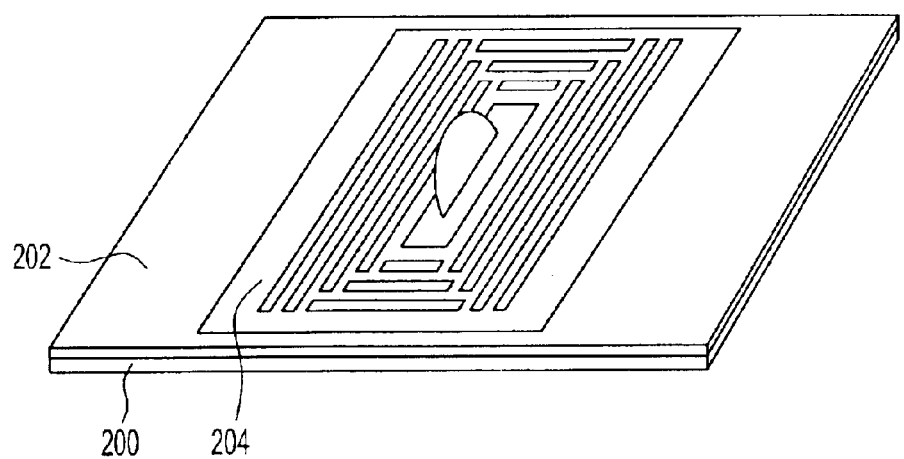
FIG. 28 is an isometric view of yet another embodiment of a detection system having a plurality of sensors arranged in a different pattern.

The sensor array of FIG. 28 is similar to that of FIG. 27 except insofar as the rectangles are not continuous and an additional side strip is provided. While there are additional sensors which require additional sensor circuitry, there are still only 14 sensors that are used to monitor 14 volumes and more precise information relating to the position, direction and speed of movement of human tissue relative to the blade can be gained from this.

Figure 29:
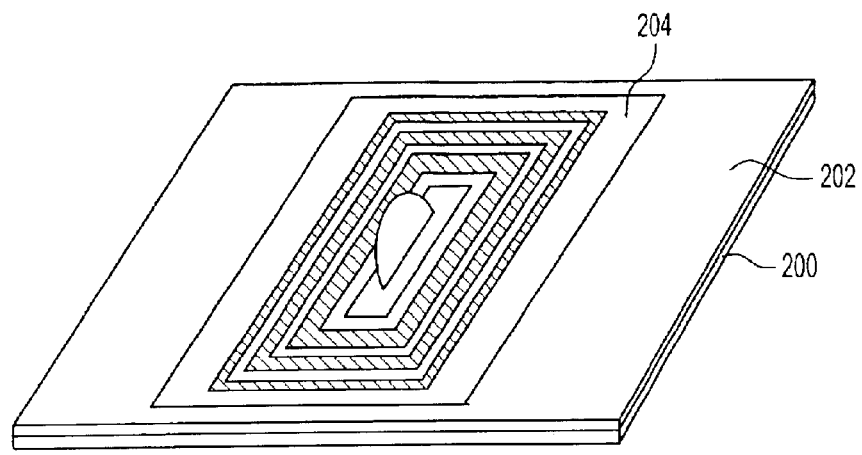
FIG. 29 is an isometric view of yet another embodiment of a detection system having a plurality of sensors arranged in a different pattern.
Figure 30:
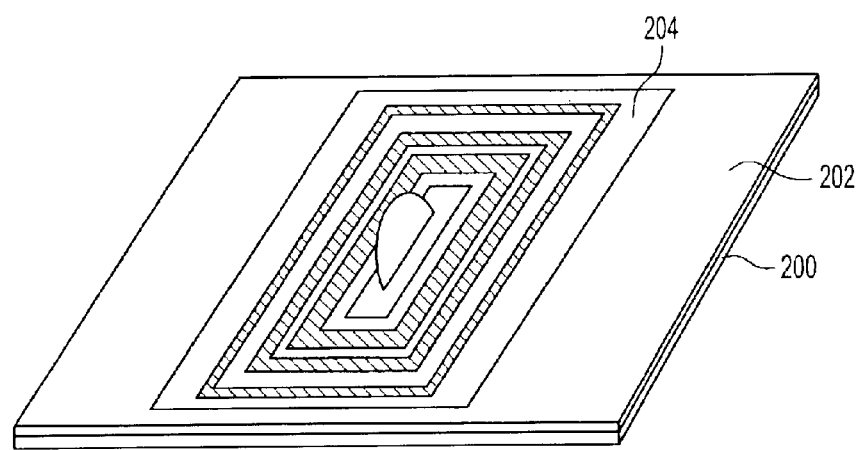
FIG. 30 is an isometric view of yet another embodiment of a detection system having a plurality of sensors arranged in a different pattern.

With regard to the sensor array of FIG. 29, it also includes rectangles, but the width of the sides of the squares increases for each square nearer the blade. The utilization of differing width sensor sides with or without identical spacing between the sensor sides can be used to advantage with the processor that must rapidly perform calculations relating to changing dielectric properties. Depending on the particular algorithms used, control of the width of sensors as well as spacing between them can simplify calculations and thereby save time which is particularly advantageous if a greater number of sensors are utilized in a particular embodiment. FIG. 30 shows a pair of hollow rectangular sensors having different width sides for different rectangles and also different spacing between the rectangular sensors.

Another alternative embodiment is to make the ground plane the same size as the deflection plate causing the field lines to have to span a larger radius circle to reach the ground, thereby extending the sensing range/sensitivity. This enables similar range/sensitivity with a smaller sensor plate. As an example the throat plate could be made into the sensor.

Figure 31:
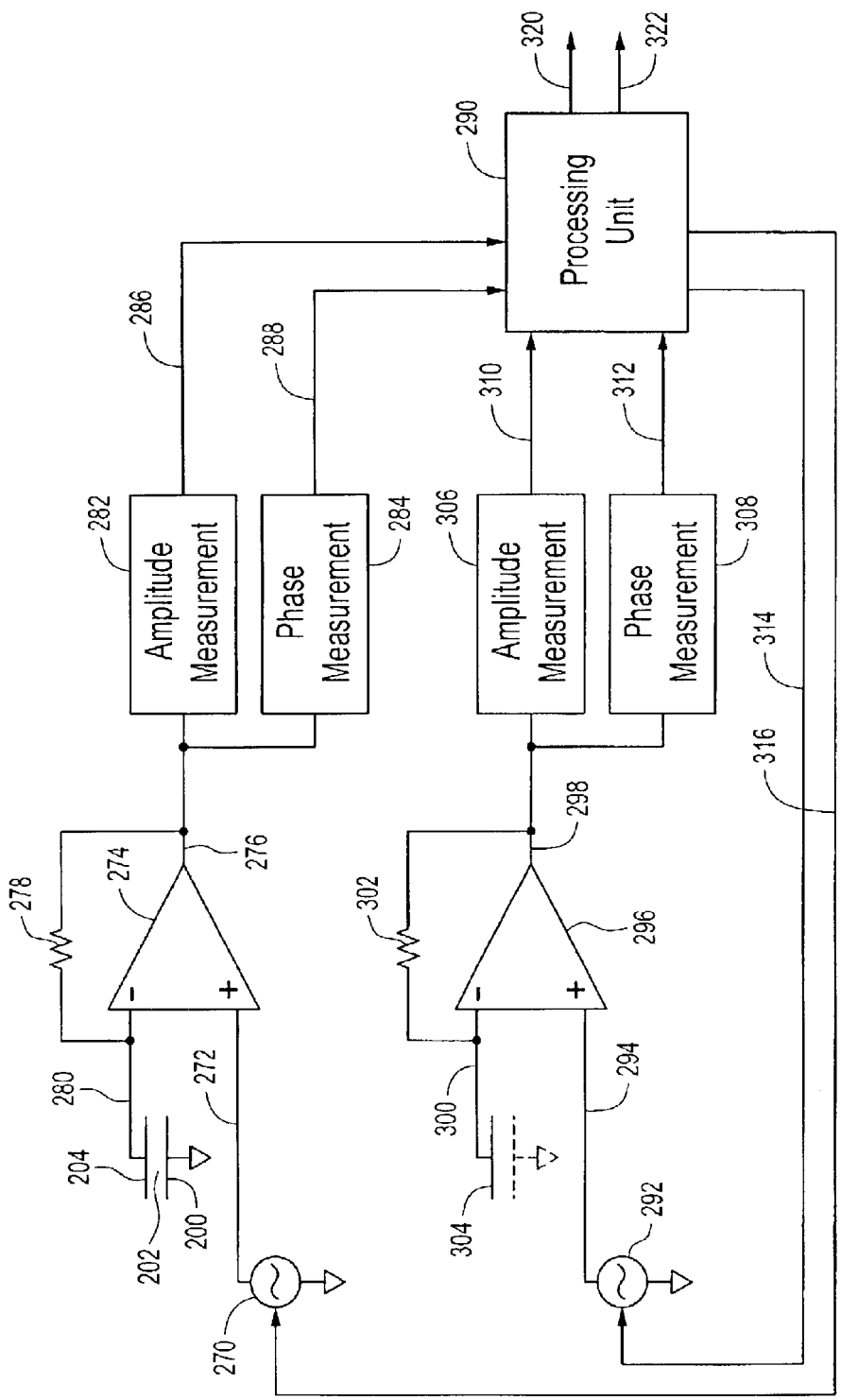
FIG. 31 is an electrical schematic diagram illustrating circuitry for use in the detection system of the present invention.

With regard to the specific circuitry that is used in the detection system, an electrical schematic diagram of representative circuitry that can be used in any of the embodiments described in FIGS. 13–30 is shown in FIG. 31. Referring to the upper portion of the circuitry, a deflection plate excitation signal generator 270 is provided for applying an excitation signal on line 272 to the positive input of a non inverting amplifier 274, the output of which appears on line 276 that is connected to a feedback resistor 278 that in turn is connected to the negative input 280 that is also connected to the deflection plate 204, which may be any of the various deflection plates shown in FIGS. 13–20 or in FIGS. 24–30. The deflection plate 204 is separated from the ground plane 200 by an insulating layer 202, with the ground plane 200 and deflection plate 204 defining a capacitor. As is the nature of operation of a non-inverting amplifier, if the signal varies at the input 272, the output on line 276 changes to equalize the voltages on the inputs 280 and 272. The output on line 276 is measured by circuitry 282 and 284 to determine the amplitude of the output signal which is provided on line 286 as well as the phase thereof on line 288, both of which extend to a processing unit 290 that may comprise a microprocessor, ASIC or other type of processing unit.

In the lower half of the circuitry of FIG. 31, a sensor signal generator 292 generates a signal to the positive input via line 294 of another non-inverting amplifier 296, the output 298 of which is connected to input 300 via a feedback resistor 302. The input 300 is also connected to a sensor plate 304 which may be any of the various sensors in the arrays of sensors shown in FIGS. 24–30. The output on line 298 is measured by circuitry 306 and 308 to provide amplitude and phase measurements on lines 310 and 312, respectively, which are also applied to the processing unit 290.

The processing unit is also adapted to programmably vary the output of the generators 270 and 292 and this is done by appropriate control signals being applied on lines 314 and 316. The generators 270 and 292 can be adjusted to provide varying amplitude, phase and frequency output signals as controlled by the processing unit 290. While both generators are often driven to produce outputs that are generally identical in terms of phase, amplitude and frequency, it should be understood that they may be varied relative to one another for the purpose of shaping the sensing volumes that are measured.

It should be understood that if objects or human tissue comes within proximity to the sensor plate, these objects or human tissue will have a dielectric property that is different from that of air and an output on line 298 will change either with a shift in phase and a change in voltage, the magnitude of which can be measured and applied to the processing unit. It should be understood that for each sensor plate that may be provided in any of the arrays shown in FIGS. 24–30 or in FIGS. 13–20, a sensor generator amplifier and amplitude and phase measuring circuitry is preferably provided and the measured characteristics are sent to the processing unit.

Because of the capability of changing the output of each sensor generator, whether applied to the sensor plates or to the blade 26, the sensing volumes for different arrays can be adjusted as desired. For example and referring to FIG. 24, the individual sensors 250 may be driven with an excitation signal that is identical for all of the sensors. It should be apparent that an end sensor 250 may define a volume with the electric field lines extending upwardly due to the deflection plate being driven with a similar excitation signal and the field lines would extend to the ground plane 202 immediately adjacent the edge of the deflection plate. However, with regard to a inwardly positioned sensor 250a, it has a larger distance to travel to the edge of the deflector plate. If all sensors are driven with an excitation signal that is constant, the field lines emanating from the deflector plate 250a would travel a height that is greater than those from sensor 250. However, it is possible to adjust the excitation signal that is applied to each sensor plate to compensate for the position so that each sensor plate would provide a nearly identical output signal for a given height regardless of the position of the sensor in the sensor array. Similar adjustment can also be achieved by manipulating the deflection plate geometry and applied potential or drive.

Since the height of the blade 26 above the table (more specifically above the deflection plate) will necessarily affect the effective capacitance of the blade as a sensor, adjustment of the height will change the amplitude and phase measurements and such measurements can be used to actually measure the height of the blade relative to the work surface of the tabletop. Since this information is available from the processing unit, it is possible to provide a digital readout of the blade height, if desired.

Figure 24:
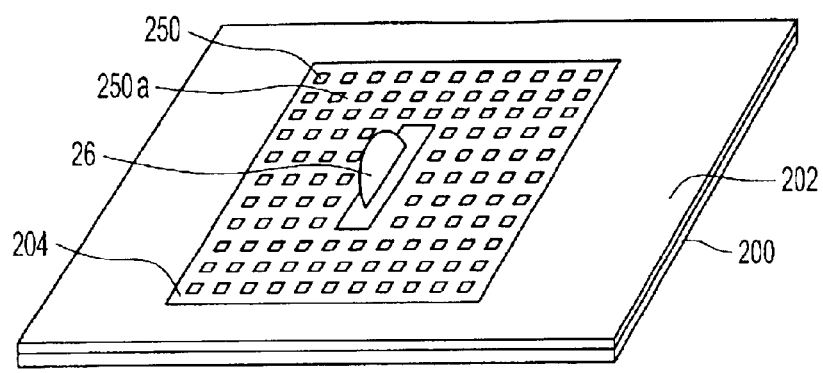
FIG. 24 is an isometric view of yet another embodiment of a detection system having a plurality of sensors arranged in a pattern.

With an array of sensors such as that shown in FIG. 24, the sensing volumes that are defined enable the detecting system to track the location of human tissue, for example, in the orthogonally oriented x, y and z directions.

It should also be understood that since the height of the blade is known, the height of a hand of an operator can also be determined and a calculation of the difference can be made in the processing unit to determine if the hand is sufficiently close to the blade to create a dangerous condition. The processing unit accumulates measurements preferably at intervals of preferably 50 to 100 microseconds and is therefore able to track changes in any of the sensing volumes on a frequent basis. This enables the processing unit to determine the presence of human tissue in any of the sensed volumes and depending upon the configuration of the array, determine the direction of movement as well as the speed of movement of the human tissue. Based upon the spatial volume measurements, the processing unit can quickly determine if a dangerous condition is approaching such as the human tissue is moving in a direction toward the blade at a speed that is likely to result in contact of the tissue with the blade, i.e., a highly dangerous situation. However, the mere closeness of tissue to the blade may not in all cases result in a dangerous condition being reached for the reason that an operator may have his hand near the blade but it is moving in a direction parallel to or away from the blade so that continued movement in that direction would not result in contact with the blade. In that situation, the processing unit would not determine that a highly dangerous or moderately dangerous condition was present.

If a dangerous condition is determined to exist, the protection system is capable of providing a measured response depending on whether the dangerous condition is moderately dangerous or highly dangerous. While the severity of the danger level may be defined and modified as desired, it is generally determined to be highly dangerous if conditions exist which will likely result in severe injury to a user given the position, direction and speed of movement of the user's hand or other tissue relative to the blade and that a moderately dangerous condition exists when conditions exist which could result in injury, although injury is not assured from the instantaneous conditions being measured at the time.

If a highly dangerous condition exists, the processing unit will issue a trigger signal on line 320 which would extend to circuitry that generates the requisite signal to fire the actuator described in one of the described embodiments to cause the blade to be retracted below the surface of the tabletop 28. If a moderately dangerous condition is created, the processor may issue a signal on line 322 which may merely shut off power to the motor 16 or some other action to render the blade safe. In the case of shutting off power to the motor, this may be done when the blade 26 is cutting a piece of lumber or the like so that when power is lost, the friction created by the lumber will rapidly brake the blade and bring it to a stop.

It should be understood that such work piece created braking does not move the position of the blade and does not brake the blade as fast as a retracting mechanism would lower the blade below the work surface of the tabletop 28. Alternatively, a clutch mechanism may be provided and installed in the drive path between the motor and the blade, such as in combination with the shaft 40 or the arbor 90. Such a clutch may be designed to release in response to an electrical signal being applied to it. Such clutch mechanisms include various models of wrap spring clutches that are electrically actuated made by the Reell Precision Manufacturing Corporation of St. Paul, Minn.

If a highly dangerous condition develops and the processing unit determines that the blade retraction mechanism should be triggered, it generates a signal on line 320 as previously described. However, because of the nature of the drive train, the blade is retracted without interrupting power to the motor so that the blade will continue to cut through the material as it moves downwardly below the surface. This is an important desirable aspect of the operation of the blade retracting mechanism for the reason that if the blade were to stop, there would be a significant increase in resistance to the downward movement. In other words, the retraction mechanism would essentially have to break through whatever thickness of material exists at the time of the triggering. This of course is in contrast to the processing unit issuing a signal on line 322 for shutting down the motor or triggering a clutch to release torque being applied to the blade, since that protective action is intended to quickly stop the blade.

It is also known that the dielectric properties of different materials vary, depending upon the applied frequency and the composition, mix and ratio of different materials between the sensing electrodes. Solid inorganic materials such as plastics are made of chains of simple molecules that are very homogeneous and have no suspended particles in liquid. Wood and lumber cellular structure, while not simple is essentially repeated uniformly throughout the mass. Human limbs on the other hand are composed of various fixed cell types (bone, muscle, connective tissue, fat, etc.) as well as unbounded cell types such as blood. The water content, the degree of self-polarization, as well as molecular suspension also varies greatly among these categories. These factors lead to variable complex dielectric properties of these different categories and can be exploited to enable their discrimination against each other. One such method is to develop material-specific signatures based on distinct phase and magnitude responses of materials to varying frequency excitation signals.

The detecting system of the present invention is also capable of definitively determining when tissue touches the blade and can therefore operate as a touch sensor. This is achieved by the known characteristic that once an operator touches the blade, there is a significant amplitude change that is measured and that change can be readily determined by the processing unit.

It should be understood that the amplitude and phase measurement circuitry 282, 284, 306 and 308 may be functionality that is provided in the processing unit 290. The processing unit may also incorporate analog-to-digital conversion of the analog output of the amplifiers, all of which is known to those of ordinary skill in the electronic arts.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the following claims.

What is claimed is:

1. A table saw comprising:

a frame structure with a generally flat work surface;

a rotatable circular blade mounted on an arbor and being adapted to have at least a portion of said blade extending above the flat work surface in position to cut a work piece;

a drive motor with an output shaft mounted to the frame structure for powering the saw blade;

a sensing mechanism for generating at least a first actuation signal responsive to predetermined sensed characteristics relating to the existence and/or movement of a person in close proximity thereto; and a retracting mechanism located beneath said work surface for rapidly moving said blade downwardly below the work surface responsive to said first actuation signal being received.

2. A table saw as defined in claim 1 wherein said retracting mechanism comprises:

an arm structure that has a first pulley operatively coupled to said arbor, a second pulley operatively coupled to said output shaft of said drive motor and a flexible belt coupling said first and second pulleys, said arm structure pivoting about an axis concentric with said output shaft so that the tension in said belt is relatively constant regardless of the position of the blade relative to said work surface;

a flywheel mounted on said axis concentric with said output shaft and being operatively connected to and driven by said motor in a direction of rotation that is downward at the portion of the arc nearer the first pulley; and an actuator connected to said arm structure for operatively engaging said rotating flywheel to stop the rotation, the inertia of said flywheel resulting in rapid downward movement of said arm structure so that said blade is moved below said work surface responsive to receiving said first actuation signal from said sensing mechanism.

3. A table saw as defined in claim 2 wherein said flywheel is located immediately adjacent one side of said arm structure, said flywheel being driven by said motor but is disengaged from said motor output shaft when said actuator operatively engages said flywheel.

4. A table saw as defined in claim 1 wherein said circular blade is electrically isolated from said arbor, drive motor output shaft and frame structure work surface, so that an excitation field can be applied to said blade.

5. A table saw comprising:

a frame structure with a generally flat work surface;

a rotatable circular blade mounted on an arbor and being adapted to have at least a portion of said blade extending above the flat work surface in position to cut a work piece;

a drive motor with an output shaft mounted to the frame structure for powering the saw blade;

a sensing mechanism for generating at least a first actuation signal responsive to predetermined sensed characteristics relating to the existence and/or movement of a person in close proximity thereto; and a retracting mechanism located beneath said work surface for rapidly moving said blade downwardly below the work surface responsive to said first actuation signal being received, wherein said retracting mechanism further comprises:

an arm structure that has a first pulley operatively coupled to said arbor, a second pulley operatively coupled to said output shaft of said drive motor and a flexible belt coupling said first and second pulleys, said arm structure pivoting about an axis concentric with said output shaft so that the tension in said belt is relatively constant regardless of the position of the blade relative to said work surface; and an actuator connected to said frame structure and said arm structure for rapidly moving said arm structure to cause said blade to be moved below said work surface responsive to receiving said first actuation signal from said sensing mechanism.

6. A table saw as defined in claim 5 wherein said actuator is a pyrotechnic device having a housing and an elongated rod extending therefrom, actuation of said device causing said rod to move longitudinally relative to said housing, one of the end of said rod and housing being connected to said frame structure and the other of the end of said rod and housing being connected to said arm structure.

7. A table saw as defined in claim 5 wherein said arm structure has a transverse extension extending from near said second pulley, said arm structure being generally L shaped, with said actuator being connected to said transverse extension.

8. A table saw as defined in claim 7 wherein the outer end of said transverse extension has a curved surface containing a plurality of teeth for engaging a worm gear, said arm structure including an elongated shaft having a worm gear portion and an a elevation crank attached to one end thereof for incrementally adjusting the amount of said blade that is above the work surface, said elongated shaft being longitudinally movable relative to said frame structure, said actuator being operatively attached to said shaft such that said shaft can be longitudinally moved while permitting rotation thereof.

9. A table saw as defined in claim 7 wherein said frame structure includes a stop pad located near the position where the blade is completely below the work surface to engage said transverse extension and stop the downward movement of said arm structure.

10. A table saw as defined in claim 5 wherein said actuator generates a moving force to said arm structure that is within the range of about 1000 to about 10000 pounds.

11. A table saw comprising:

a frame structure with a generally flat work surface;

a rotatable circular blade mounted on an arbor and being adapted to have at least a portion of said blade extending above the flat work surface in position to cut a work piece;

a drive motor with an output shaft mounted to the frame structure for powering the saw blade;

a sensing mechanism for generating at least a first actuation signal responsive to predetermined sensed characteristics relating to the existence and/or movement of a person in close proximity thereto;

a retracting mechanism located beneath said work surface for rapidly moving the blade downwardly below the work surface responsive to said first actuation signal being received, wherein said retracting mechanism moves said blade beneath said work surface within less than approximately 7 milliseconds after said first actuation signal is received by said retracting mechanism.

12. A table saw comprising:

a frame structure with a generally flat work surface;

a rotatable circular blade mounted on an arbor and being adapted to have at least a portion of said blade extending above the flat work surface in position to cut a work piece, said circular blade being electrically isolated from said arbor, a drive motor output shaft and said frame structure work surface, so that an excitation field can be applied to said blade;

a drive motor with an output shaft mounted to the frame structure for powering said blade;

a sensing mechanism for generating at least a first actuation signal responsive to predetermined sensed characteristics relating to the existence and/or movement of a person in close proximity thereto;

a retracting mechanism located beneath said work surface for rapidly moving the blade downwardly below the work surface responsive to said first actuation signal being received, wherein said sensing mechanism comprises:

said work surface defining a ground plane and having a slot opening through which said blade can extend;

at least one electrically conductive deflection plate electrically isolated from but attached to said work surface for shaping an electric field that emanates from said blade when an excitation field is applied thereto;

circuitry for selectively generating and applying excitation signals to each of said deflection plates and to said blade to thereby define at least one sensing volume near said blade above said work surface;

circuitry for sensing the dielectric constant of said sensing volume and generating sensed signals that are indicative of the sensed dielectric constant;

a processor for receiving said generated signals and for producing said first actuation signal when predetermined sensed characteristics indicate that a person is in a highly dangerous position relative to said blade.

13. A table saw as defined in claim 12 wherein said sensing circuitry senses at least one of the intensity and phase of the dielectric characteristic, said processor being capable of determining changes in the intensity and phase of the dielectric characteristic from successively sensed dielectric characteristic values.

14. A table saw as defined in claim 12 wherein said sensing circuitry comprises an amplifier connected to said blade relative to ground, said amplifier having an output with said sensed signals that are at least intermittently applied to said processor.

15. A table saw as defined in claim 14 wherein said sensing circuitry further comprises circuitry for measuring the phase of the sensed signals relative to the phase of an excitation signal that is applied to said blade and for measuring the amplitude of the sensed signals and applying said sensed amplitude and sensed phase signals at least intermittently to said processor.

16. A table saw as defined in claim 14 wherein said sensing mechanism further comprises additional sensing circuitry including an amplifier connected to said deflection plate, and circuitry for measuring the phase of sensed signals relative to the phase of an excitation signal that is applied to said deflection plate and for measuring the amplitude of the sensed signals and applying said sensed amplitude and sensed phase signals at least intermittently to said processor.

17. A table saw as defined in claim 12 wherein said excitation signal generating circuitry is capable of generating excitation signals for each of said blade and deflection plate that has individual variable amplitude, phase and frequency characteristics.

18. A table saw as defined in claim 17 wherein said processor is operatively connected to said excitation signal generating circuitry and is capable of variably controlling the characteristics of said excitation signals.

19. A table saw as defined in claim 12 wherein said processor generates a second actuation signal for terminating said motor from driving said blade when predetermined sensed characteristics indicate that a person is in a moderately dangerous position relative to said blade.

20. A table saw as defined in claim 19 further including a switch for controlling the application of electric power to said motor, wherein terminating said motor from driving said blade comprises operating said switch to remove power to said motor.

21. A table saw as defined in claim 19 further including a clutch mechanism operatively installed between said motor and said blade for disconnecting application of power to said blade, wherein terminating the motor from driving said blade comprises actuating said clutch mechanism.

22. A table saw as defined in claim 12 wherein said sensing mechanism comprises a plurality of deflection plates located on said work surface adjacent said slot opening, said deflection plates being bonded to an electrical insulating layer generally coextensive with the surface of said deflection plates, said insulting layer being bonded to said work surface.

23. A table saw as defined in claim 12 wherein said sensing mechanism comprises at least one deflection plate that generally cover a substantial portion of the area of said work surface adjacent said slot opening, said deflection plates being bonded to an electrical insulating layer generally coextensive with the surface of said deflection plates, said insulting layer being bonded to said work surface, an array of conductive sensor plates positioned around said slot opening and being bonded to an insulating layer that is bonded to said deflection plate, each sensor plate in said array being connected to said excitation signal generating circuitry and said sensing circuitry, each sensor plate thereby defining a separate sensing volume when excitation signals are applied thereto, said sensing circuitry for each sensor plate generating signals indicative of the sensed dielectric characteristic in its sensed volume.

24. A table saw as defined in claim 23 wherein said array of sensor plates comprises a plurality of sensor strips that are positioned at increasing distances from said slot opening in opposite directions from the lengthwise direction of said slot opening and in opposite directions from the ends of said slot opening.

25. A table saw as defined in claim 23 wherein said array of sensor plates comprises a plurality of small square shaped sensor plates generally evenly spaced from one another from said slot opening outwardly in all directions therefrom.

26. A table saw as defined in claim 23 wherein said array of sensor plates comprises a plurality of concentric increasing sized hollow rectangles extending from said slot opening.

27. A table saw as defined in claim 26 wherein each of said rectangles comprises of a plurality of individual strips.

28. A table saw as defined in claim 27 wherein the width of the sides of said rectangles are generally constant.

29. A table saw as defined in claim 23 wherein said processor receives said signals of sensed dielectric characteristic within each volume defined by each sensor plate, said processor performing calculations regarding successive signals regarding each volume and thereby determining sensed characteristics relating to the existence and/or movement of a person in close proximity to the array of sensor plates.

30. A table saw as defined in claim 29 wherein said processor is capable of determining the height of the saw blade relative to said work surface from said sensed signals.

31. A table saw as defined in claim 29 wherein said processor is capable of determining the distance a portion of a human is from said work surface in any one or more of x, y or z coordinate directions from said sensed signals.

32. A table saw as defined in claim 29 wherein said processor is capable of determining the distance of a portion of a human is from said work surface in any one or more of x, y or z coordinate directions, and generally simultaneously determining height of said blade above the work surface and determining the distance of a portion of a human is from said blade in any one or more of x, y or z coordinate directions from said sensed signals.

33. A table saw as defined in claim 29 wherein said processor is capable of determining the direction that a portion of a human is moving relative to said blade and thereby determine whether the portion is moving toward said blade from said sensed signals.

34. A table saw as defined in claim 29 wherein said processor is capable of determining the speed of movement of a portion of a human upon receipt of successive sensed signals.

35. A table saw as defined in claim 29 wherein said processor is capable of determining contact of said blade by a portion of a human from said sensed signals.

36. A table saw as defined in claim 29 wherein said processor is capable of determining the beginning of a kickback action from said sensed signals.

37. A table saw as defined in claim 29 wherein said excitation signal generating circuitry is capable of varying the frequency of said excitation signals, said processor being capable of determining additional characteristics from said sensed signals that are generated as a result of varying the frequency of said excitation signals.

38. A system for sensing an object in proximity to a surface, said system comprising:
   said surface defining an electrical ground;
   at least one electrically conductive deflection plate electrically isolated from but operatively attached to said surface;
   at least one electrically conductive sensor electrically isolated from but operatively associated with said deflection plate;
   said at least one deflection plate shaping an electric field that emanates from said at least one sensor when an excitation field is applied thereto;
   circuitry for selectively generating and applying excitation signals to each of said deflection plates and to said sensor to thereby define at least one sensing volume near said sensor away from said surface;
   circuitry for sensing the dielectric constant of said sensing volume and generating sensed signals that are indicative of the sensed dielectric characteristic;
   a digital processor for receiving said generated signals and for determining the presence of the object from an analysis of a plurality of said generated sensed signals.

39. A system as defined in claim 38 wherein said sensing circuitry senses at least one of the intensity and phase of the dielectric characteristic, said processor being capable of determining changes in the intensity and phase of the dielectric characteristics from successively sensed dielectric characteristic values.

40. A system as defined in claim 39 wherein said sensing circuitry further comprises circuitry for measuring the phase of the sensed signals relative to the phase of an excitation signal that is applied to said sensor and for measuring the amplitude of the sensed signals and applying said sensed amplitude and sensed phase signals at least intermittently to said processor.

41. A system as defined in claim 38 further comprising a plurality of sensors and wherein said excitation signal generating circuitry is capable of generating excitation signals for each of said sensors and said deflection plate that provide individual and optionally variable amplitude, phase and frequency characteristics to thereby define a plurality of sensing volumes that have individually defined characteristics.

42. A system as defined in claim 41 further comprising a plurality of deflection plates and wherein said excitation signal generating circuitry is capable of generating excitation signals for each of said sensors and for each of said deflection plates that has individual and optionally variable amplitude, phase and frequency characteristics to thereby define a plurality of sensing volumes that have individually defined characteristics.

43. A system as defined in claim 42 wherein said processor is operatively connected to said excitation signal generating circuitry and is capable of variably controlling the characteristics of said excitation signals.

44. A system for sensing a human in proximity to a moving element of a structure which is in proximity to a sensor operatively associated with the structure, said system comprising:
   at least a portion of said structure defining an electrical ground;
   at least one electrically conductive deflection member electrically isolated from but operatively attached to said portion of said structure;
   at least one electrically conductive sensor electrically isolated from but operatively associated with said deflection member;
   said at least one deflection member shaping an electric field that emanates from said at least one sensor when an excitation field is applied thereto;
   circuitry for selectively generating and applying excitation signals to each of said deflection member and to said sensor to thereby define at least one sensing volume near said moving element;
   circuitry for sensing the dielectric characteristics of said sensing volume and generating sensed signals that are indicative of the sensed dielectric characteristics;
   a digital processor for receiving said generated signals and for determining the presence of the human in proximity to said moving element from an analysis of a plurality of said generated sensed signals.

45. A system as defined in claim 44 wherein said deflection members are in the form of a generally flat plate.

* * * * *